US012103155B2

(12) United States Patent
Han et al.

(10) Patent No.: US 12,103,155 B2
(45) Date of Patent: Oct. 1, 2024

(54) ELECTRIC HAMMER

(71) Applicant: Nanjing Chervon Industry Co., Ltd., Nanjing (CN)

(72) Inventors: Yan Han, Nanjing (CN); Jiuling Yao, Nanjing (CN); Jianheng Cai, Nanjing (CN); Hongbo Sun, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/177,535

(22) Filed: Mar. 2, 2023

(65) Prior Publication Data

US 2023/0202015 A1 Jun. 29, 2023

Related U.S. Application Data

(63) Continuation of application No. PCT/CN2021/118443, filed on Sep. 15, 2021.

(30) Foreign Application Priority Data

Sep. 25, 2020 (CN) ......................... 202011021007.3
Sep. 25, 2020 (CN) ......................... 202011021012.4
(Continued)

(51) Int. Cl.
*B25D 16/00* (2006.01)
*B25D 11/06* (2006.01)

(52) U.S. Cl.
CPC .......... *B25D 16/006* (2013.01); *B25D 11/062* (2013.01); *B25D 16/003* (2013.01);
(Continued)

(58) Field of Classification Search
CPC ................ B25D 16/006; B25D 16/003; B25D 11/062
See application file for complete search history.

(56) References Cited

U.S. PATENT DOCUMENTS

| | | | | |
|---|---|---|---|---|
| 7,395,872 B2 * | 7/2008 | Duesselberg | ........ | B25D 16/006 173/48 |
| 2006/0137888 A1 * | 6/2006 | Soika | .................. | B25D 16/006 173/48 |
| 2008/0011499 A1 | 1/2008 | Saur | | |
| 2010/0051303 A1 * | 3/2010 | Ullrich | ................ | B25D 16/006 173/48 |

(Continued)

FOREIGN PATENT DOCUMENTS

| | | |
|---|---|---|
| CN | 102470524 A | 5/2012 |
| CN | 108972457 A | 12/2018 |

(Continued)

OTHER PUBLICATIONS

ISA/CN, Int. Search Report issued on PCT application No. PCT/CN2021/118443, dated Nov. 30, 2021, 5 pages.

(Continued)

*Primary Examiner* — Nathaniel C Chukwurah
(74) *Attorney, Agent, or Firm* — Greenberg Traurig, LLP

(57) ABSTRACT

An electric hammer includes a housing, an electric motor, an output assembly, an impact assembly, a mounting shaft, a clutch assembly, and a switching assembly. The mounting shaft is rotatable about a second axis. When the electric hammer is in the drill mode, a sleeve of the output assembly rotates. When the electric hammer is in the hammer drill mode, the sleeve rotates and an impact block of the impact assembly reciprocates in the sleeve. The switching assembly is configured to switch the clutch assembly between a first state and a second state and includes a switching element. The switching element includes a forced end and a drive end, the output assembly moving along a first axis drives the forced end to move, and the drive end is configured to drive the clutch assembly to be switched to the first state.

17 Claims, 15 Drawing Sheets

A-A

(30) Foreign Application Priority Data

| | | |
|---|---|---|
| Sep. 25, 2020 | (CN) | 202011022734.1 |
| Sep. 25, 2020 | (CN) | 202022143093.7 |
| Sep. 25, 2020 | (CN) | 202022143274.X |
| Sep. 25, 2020 | (CN) | 202022151258.5 |

(52) U.S. Cl.
CPC ................ *B25D 2216/0084* (2013.01); *B25D 2250/095* (2013.01); *B25D 2250/121* (2013.01); *B25D 2250/331* (2013.01)

(56) References Cited

U.S. PATENT DOCUMENTS

| | | | | |
|---|---|---|---|---|
| 2011/0100663 | A1 | 5/2011 | Wu | |
| 2014/0000923 | A1* | 1/2014 | Dietel | B25D 16/006 173/47 |
| 2017/0252915 | A1* | 9/2017 | Furusawa | B25D 11/062 |

FOREIGN PATENT DOCUMENTS

| | | | |
|---|---|---|---|
| CN | 214055145 | U | 8/2021 |
| CN | 214055146 | U | 8/2021 |
| DE | 202018105582 | U1 | 11/2018 |
| DE | 202020103996 | U1 | 7/2020 |
| JP | 02284881 | A | 11/1990 |
| JP | 2009196044 | A | 9/2009 |

OTHER PUBLICATIONS

ISA/CN, English translation of the Int. Search Report issued on PCT application No. PCT/CN2021/118443, dated Nov. 30, 2021, 4 pages.

ISA/CN, Written Opinion issued on PCT application No. PCT/CN2021/118443, dated Nov. 30, 2021, 5 pages.

ISA/CN, English translation of Written Opinion issued on PCT application No. PCT/CN2021/118443, dated Nov. 30, 2021, 4 pages.

* cited by examiner

ELECTRIC HAMMER

RELATED APPLICATION INFORMATION

This application is a continuation of International Application Number PCT/CN2021/118443, filed on Sep. 15, 2021, through which this application also claims the benefit under 35 U.S.C. § 119(a) of Chinese Patent Application No. CN 202011022734.1, filed on Sep. 25, 2020, Chinese Patent Application No. CN 202011021007.3, filed on Sep. 25, 2020, Chinese Patent Application No. CN 202022143093.7, filed on Sep. 25, 2020, Chinese Patent Application No. CN 202011021012.4 filed on Sep. 25, 2020, Chinese Patent Application No. CN 202022143274.X filed on Sep. 25, 2020, and Chinese Patent Application No. CN 202022151258.5 filed on Sep. 25, 2020, which are incorporated by reference in their entireties.

TECHNICAL FIELD

The present application relates to a power tool, for example, an electric hammer.

BACKGROUND

Electric hammers are widely used power tools and mainly used for perforating concrete, floor slabs, brick walls, and stone. In the related art, many electric hammers implement a perforation function and are adjustable to an appropriate position and matched with an appropriate drill bit so that the electric hammers can replace ordinary electric drills, which are a hammer drill mode and a drill mode.

However, when these electric hammers implement function conversion, the switchover between the hammer drill mode and the drill mode needs to be implemented by a very complicated switching assembly. In this manner, the switching assembly often has a very complicated structure, and further the dimension of the whole machine is increased, causing inconvenience to the operation of the user.

SUMMARY

The present application provides an electric hammer which has a simple structure and is convenient for a user to switch functions.

An example provides an electric hammer including a housing, an electric motor, an output assembly, an impact assembly, and a mounting shaft. The electric motor is at least partially disposed in the housing. The output assembly includes a sleeve rotatable about a first axis. The impact assembly includes a swash bearing and an impact block capable of being driven by the swash bearing to reciprocate in the sleeve, where the impact block is capable of outputting an impact force forward when moving in the sleeve. The mounting shaft is used for mounting the swash bearing, where the mounting shaft is capable of being driven by the electric motor to rotate about a second axis. The electric hammer has a drill mode and a hammer drill mode; when the electric hammer is in the drill mode, the sleeve rotates; and when the electric hammer is in the hammer drill mode, the sleeve rotates and the impact block reciprocates in the sleeve. The electric hammer further includes a clutch assembly and a switching assembly. The clutch assembly has a first state in which the swash bearing is capable of being driven to move with the mounting shaft and a second state in which the mounting shaft is allowed to rotate relative to the swash bearing. The switching assembly is configured to switch the clutch assembly between the first state and the second state and includes a switching element, where the switching element includes a forced end and a drive end, the output assembly moving along the first axis drives the forced end to move, and the drive end is configured to drive the clutch assembly to be switched to the first state. The switching element is disposed on a lower side of the first axis.

In an example, the switching element is disposed between the first axis and the second axis.

In an example, the sleeve is substantially symmetrical about a vertical plane; and a portion of the switching element between the first axis and the second axis is distributed on two sides of the vertical plane.

In an example, the electric hammer further includes a first transmission member configured to receive power outputted from the electric motor to drive the mounting shaft to rotate. The clutch assembly includes an input portion and an output portion. The input portion rotates synchronously with the first transmission member or the mounting shaft, and the output portion for mating with the input portion drives the swash bearing to move, where the swash bearing is slidable on the mounting shaft along the second axis, the output portion is slidable with the swash bearing along the second axis, and the switching element is disposed on a front side of the swash bearing and is capable of driving a whole formed by the swash bearing and the output portion to slide along the second axis.

In an example, the swash bearing includes a bearing core mounted to the mounting shaft, where the bearing core extends toward the first transmission member to form the output portion.

In an example, the output assembly further includes a first transmission portion and a second transmission portion. The first transmission portion is fixedly connected to the sleeve, and the second transmission portion rotates synchronously with the mounting shaft and drives the first transmission portion to rotate, where the forced end of the switching element abuts against the first transmission portion.

In an example, the electric hammer further includes a support bracket fixedly connected to or integrally formed with the housing, where the support bracket is configured to support the mounting shaft, and a guide slot for the switching element to move along is formed on or fixedly connected to the support bracket.

In an example, the switching element is disposed between the sleeve and the mounting shaft.

In an example, the output assembly further includes a first transmission portion and a second transmission portion. The first transmission portion is fixedly connected to the sleeve, and the second transmission portion rotates synchronously with the mounting shaft and drives the first transmission portion to rotate, where an orthographic projection of the first transmission portion on a plane perpendicular to the first axis has a highest point and a lowest point, and an orthographic projection of the switching element on the plane is located between the highest point and the lowest point.

An electric hammer includes a housing, an electric motor, an output assembly, an impact assembly, and a mounting shaft. The electric motor is at least partially disposed in the housing. The output assembly includes a sleeve rotatable about a first axis. The impact assembly includes a swash bearing and an impact block capable of being driven by the swash bearing to reciprocate in the sleeve, where the impact block is capable of outputting an impact force forward when moving in the sleeve. The mounting shaft is used for mounting the swash bearing, where the mounting shaft is capable of being driven by the electric motor to rotate about a second axis. The electric hammer has a drill mode and a hammer drill mode; when the electric hammer is in the drill mode, the sleeve rotates; and when the electric hammer is in the hammer drill mode, the sleeve rotates and the impact block reciprocates in the sleeve. The electric hammer further includes a clutch assembly and a switching assembly. The clutch assembly has a first state in which the swash bearing is capable of being driven to move with the mounting shaft and a second state in which the mounting shaft is allowed to rotate relative to the swash bearing. The switching assembly is configured to switch the clutch assembly between the first state and the second state, where the switching assembly includes a switching element disposed between the first axis and the second axis.

In an example, the electric hammer further includes a transmission assembly including a first transmission member capable of being driven by the electric motor to rotate about the second axis, where the first transmission member is fixedly connected to the mounting shaft. The swash bearing includes a bearing core mounted on the mounting shaft, where when the electric hammer is in the hammer drill mode, the sleeve rotates and the bearing core rotates synchronously with the mounting shaft. The swash bearing is slidable on the mounting shaft along the second axis to a first position and a second position, where when the swash bearing is at the first position, the bearing core rotates synchronously with the mounting shaft, and when the swash bearing is at the second position, the mounting shaft is rotatable relative to the bearing core. The electric hammer further includes a locking element, where when the swash bearing is at the second position, the locking element is configured to restrain the bearing core from rotating, and when the swash bearing is at the first position, the locking element allows the bearing core to rotate.

In an example, the bearing core is connected to an engagement portion which is configured to mate with the locking element.

In an example, the transmission assembly includes an input portion configured to output power to the swash bearing, and the bearing core is connected to an output portion which mates with the input portion when the swash bearing is at the first position.

In an example, the output portion and the engagement portion are disposed at two ends of the bearing core separately.

In an example, the locking element is fixedly connected to or integrally formed with the housing.

In an example, the bearing core protrudes forward and forms an engagement portion.

In an example, the electric hammer further includes the switching element configured to drive the swash bearing to move toward the first position so as to cause the electric hammer to enter the hammer drill mode.

In an example, an engagement portion is disposed at an end of the bearing core facing the switching element.

In an example, the electric hammer further includes a reset member biasing the swash bearing to move toward a position where an engagement portion mates with the locking element.

In an example, the electric hammer further includes a transmission assembly including a first transmission member capable of being driven by the electric motor to rotate about the second axis, where the first transmission member is fixedly connected to the mounting shaft. The swash bearing includes a bearing core mounted on the mounting shaft, where when the electric hammer is in the hammer drill mode, the sleeve rotates and the bearing core rotates synchronously with the mounting shaft. The swash bearing is slidable on the mounting shaft along the second axis to a first position and a second position, where when the swash bearing is at the first position, the bearing core rotates synchronously with the mounting shaft, and when the swash bearing is at the second position, the mounting shaft is rotatable relative to the bearing core. The electric hammer further includes a locking element, where when the swash bearing is at the first position, the locking element is separated from the bearing core to allow the bearing core to rotate, and when the swash bearing is at the second position, the locking element meshes with the bearing core to restrain the bearing core from rotating.

In an example, the electric hammer includes a main body including the housing. The sleeve has a length L1 along a direction of the first axis, the main body has a length L2 along the direction of the first axis, and the housing has a length L3 in a direction perpendicular to the first axis, where a ratio of the length L2 to the length L1 is greater than or equal to 2.5 and less than or equal to 4, and the length L3 is greater than or equal to 55 mm and less than 70 mm.

In an example, the output assembly further includes a first transmission portion mating with the mounting shaft and configured to transmit power of the electric motor to the sleeve, where the first transmission portion includes a rotating member fixedly connected to the sleeve and an intermediate member mating with the rotating member; where an accommodation space configured to accommodate the intermediate member is formed on the rotating member.

In an example, a diameter of the accommodation space is smaller than a root diameter of the rotating member.

In an example, a transmission assembly further includes an input portion configured to output power to the swash bearing, and the swash bearing is connected to an output portion which mates with the input portion, where when the electric hammer is in the drill mode, the output portion is separated from the output portion, and when the electric hammer is in the hammer drill mode, the output portion is coupled to the input portion.

In an example, the swash bearing includes a bearing core mounted on the mounting shaft, where the bearing core protrudes rearward and forms the output portion; and a first transmission member is recessed inward to form the input portion.

In an example, the electric hammer further includes the switching element configured to drive the swash bearing to move along the second axis so as to cause the output portion to be coupled to the input portion.

In an example, the electric hammer further includes a shift assembly including a limiting portion configured to prevent the switching element from moving rearward along the direction of the first axis, where a stopper portion configured to mate with the limiting portion is fixedly connected to or integrally formed with the switching element, when the electric hammer is in the drill mode, the limiting portion abuts against the stopper portion to prevent the switching element from moving rearward along the direction of the first axis, and when the electric hammer is in the hammer drill mode, the limiting portion is separated from the stopper portion to allow the switching element to move rearward along the direction of the first axis.

In an example, the electric hammer further includes a first bearing and a second bearing which are mounted onto the mounting shaft to support the mounting shaft; where a distance between the first bearing and the second bearing along a direction of the second axis is greater than or equal to 30 mm and less than or equal to 50 mm.

In an example, the first bearing and the second bearing are disposed on two sides of the swash bearing separately, and the first transmission portion is disposed on a front side of the first bearing and the second bearing.

In an example, a length of the sleeve along a direction of the first axis is less than or equal to 101 mm.

DETAILED DESCRIPTION

Figure 1:
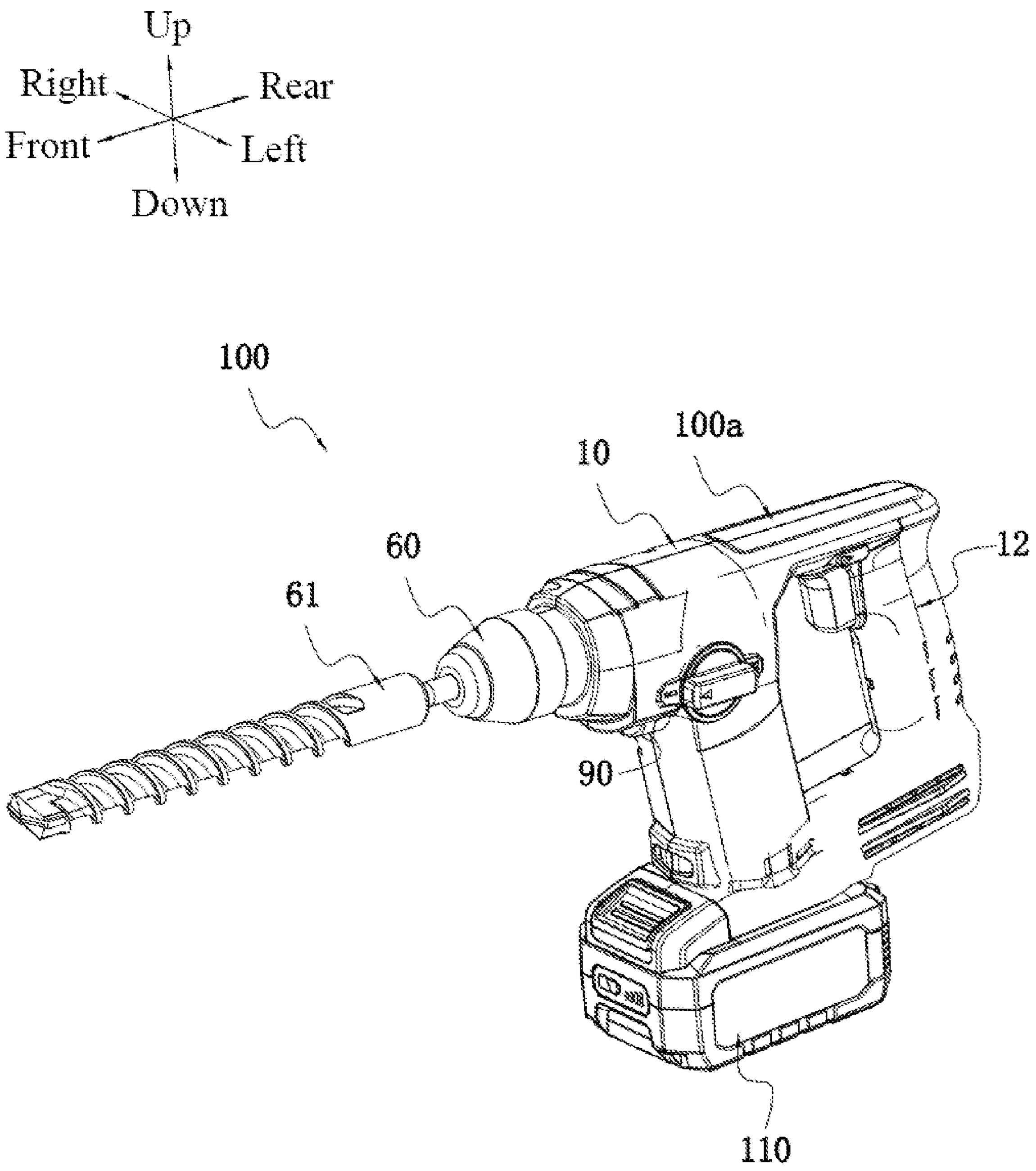
FIG. 1 is a perspective view of an electric hammer in a first example of the present application.

An electric hammer 100 shown in FIG. 1, as a commonly used power tool, can drive a functional element 61 to rotate, and the functional element 61 may be a drill bit. In this manner, the electric hammer 100 can drive the functional element 61 to perforate hard materials such as wall surfaces, concrete, bricks, and stone.

To clearly illustrate the technical solutions of the present application, up, down, front, rear, left, and right shown in FIG. 1 are defined.

Figure 2:
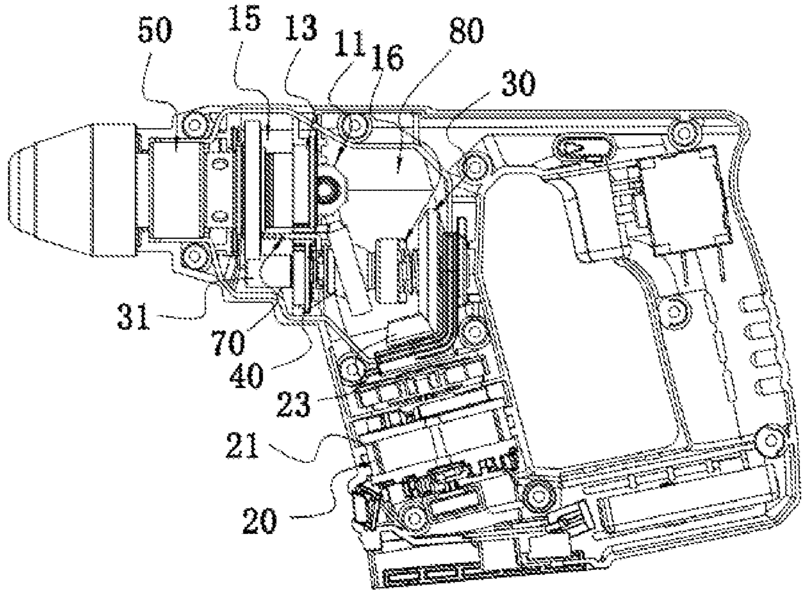
FIG. 2 is a plan view of part of the structure of the electric hammer shown in FIG. 1.

FIGS. 1 to 15 show the schematic views of the structure of an electric hammer in a first example. As shown in FIGS. 1 and 2, the electric hammer 100 includes a main body 100*a* and an energy source, and the main body 100*a* includes a housing 10, a power assembly 20, a transmission assembly 30, an impact assembly 40, an output assembly 50, a clamping assembly 60, and the energy source. In this example, the energy source may be specifically a battery pack 110.

The housing 10 is formed with an accommodation space 11 configured to accommodate various parts in the electric hammer 100. That is, the power assembly 20, the output assembly 50, the transmission assembly 30, and the impact assembly 40 are at least partially disposed in the accommodation space 11. The housing 10 is formed with or connected to a handle portion 12 which may be held by a user. The user may operate the electric hammer 100 by holding the handle portion 12.

The power assembly 20 is used for supplying power to the electric hammer 100 and includes an electric motor 21, where the electric motor 21 includes an electric motor shaft 22 rotatable about an electric motor axis 101.

The transmission assembly 30 is configured to transmit the power outputted from the electric motor shaft 22 to the output assembly 50 and the impact assembly 40.

The output assembly 50 includes a sleeve 51 which can be driven by the transmission assembly 30 to rotate about a first axis 102. In an example, the sleeve 51 is formed with a receiving cavity configured to receive the functional element 61, and the functional element 61 may be inserted into the receiving cavity. The clamping assembly 60 may keep the functional element 61 on the sleeve 51. When the sleeve 51 rotates about the first axis 102, the functional element 61 can be driven to rotate.

The impact assembly 40 includes a swash bearing 40*a* and an impact block 44, where the swash bearing can be driven by the transmission assembly 30 to impact the impact block 44, and the impact block 44 can be in contact with the functional element 61 mounted in the sleeve 51. In this manner, when the swash bearing 40*a* reciprocally impacts the impact block 44, the impact block 44 can intermittently output an impact force to the functional element 61 so that the functional element 61 performs perforation more efficiently.

The energy source is used for supplying energy to the electric hammer 100. The energy source may be an alternating current or a direct current. The direct current is adopted in this example, that is, the energy source is specifically the battery pack 110. The battery pack 110 may be inserted into the housing 10, or the battery pack 110 may be separated from the housing 10, that is, the battery pack 110 is not directly mounted on the surface of the housing 10. As long as a power source can be supplied, a specific mounting manner is not limited here.

Figure 6:
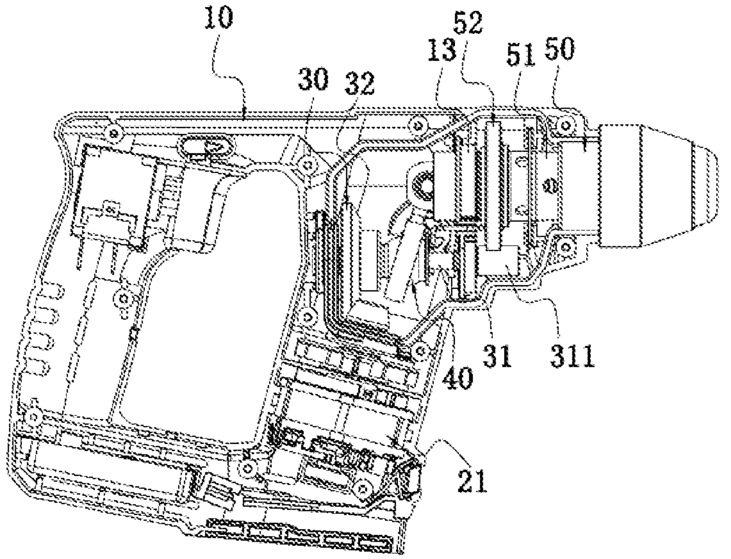
FIG. 6 is a plan view of part of the structure of the electric hammer shown in FIG. 1 in a hammer drill mode.

The electric hammer 100 further includes a clutch assembly 80. The clutch assembly 80 is configured to disable or enable the power transmission between the transmission assembly 30 and the impact assembly 40. The clutch assembly 80 has a first state and a second state. When the clutch assembly 80 is in the first state, the clutch assembly 80 can transmit the power outputted from the transmission assembly to the impact assembly 40, and in this case, the impact assembly 40 can output the impact force to the functional element 61. When the clutch assembly 80 is in the first state (as shown in FIG. 6), the functional element 61 is not only driven by the output assembly 50 to rotate about the first axis 102 but also receives a driving force outputted from the impact assembly 40. Thus, the electric hammer 100 is in a hammer drill mode. When the clutch assembly 80 is in the second state (as shown in FIG. 2), the clutch assembly 80 disables the power transmission between the transmission assembly 30 and the impact assembly 40, and the transmission assembly 30 no longer drives the impact assembly 40. In this case, the impact assembly 40 cannot output the impact force to the functional element 61. Thus, when the clutch assembly 80 is in the second state, the functional element 61 cannot be driven by the impact assembly 40 and can only be driven by the output assembly 50 to rotate about the first axis 102. Thus, the electric hammer 100 is in a drill mode.

The electric hammer 100 further includes a switching assembly 70. The switching assembly 70 is configured to switch the electric hammer 100 between the drill mode and the hammer drill mode. The switching assembly 70 can transmit a driving force from the output assembly 50 to the clutch assembly 80, thereby switching the clutch assembly 80 to the first state. In an example, when the user needs to put the electric hammer 100 in the hammer drill mode, the functional element 61 is pressed to move the sleeve 51 along the direction of the first axis 102 so that the switching assembly 70 drives the clutch assembly 80 to switch to the first state. Thus, the electric hammer 100 is switched to the hammer drill mode. That is to say, the user can switch the electric hammer 100 to the hammer drill mode without excessive operation steps, thereby facilitating the use of the user, saving time, and improving working efficiency.

As shown in FIGS. 3 to 5 and 9 to 12, the transmission assembly 30 includes a mounting shaft 31, a first transmission member 32, and a second transmission member 23. The second transmission member 23 is fixedly connected to the electric motor shaft 22, and the first transmission member 32 meshes with the second transmission member 23 to receive the power outputted from the electric motor 21. The mounting shaft 31 is fixedly connected to the first transmission member 32, that is to say, when the first transmission member 32 rotates, the mounting shaft 31 rotates with the first transmission member 32. In this manner, the electric motor 21 may output the power to the mounting shaft 31 through the first transmission member 32 and the second transmission member 23 to drive the mounting shaft 31 to rotate about a second axis 103, where the second axis 103 and the first axis 102 are parallel to each other. In this example, the first transmission member 32 is a bevel gear, and the second transmission member 23 is a bevel gear portion which is formed by the electric motor shaft 22 and meshes with the bevel gear. The first transmission member 32 and the second transmission member 23 may be other structures, and the specific structures thereof are not limited here as long as a force can be transmitted.

The output assembly 50 further includes a first transmission portion 52, and a second transmission portion 311 is formed on the mounting shaft 31. The first transmission portion 52 is fixedly mounted to the sleeve 51, and the second transmission portion 311 is fixedly mounted to the mounting shaft 31 to rotate synchronously with the mounting shaft 31. The first transmission portion 52 and the second transmission portion 311 are both transmission gears, and the first transmission portion 52 and the second transmission portion 311 mesh with each other. In this manner, after the electric hammer 100 is started, the electric motor drives the mounting shaft 31 to perform transmission, and the second transmission portion 311 on the mounting shaft 31 drives the whole formed by the first transmission portion 52 and the sleeve 51 to rotate so that the sleeve 51 drives the functional element 61 to rotate.

The swash bearing **40*a* in the impact assembly 40 includes a striking member 41, a swing link 42, and a bearing core 43. The striking member 41 can reciprocate in the sleeve 51 to impact the impact block 44 so that the impact block 44 impacts the functional element 61. The striking member 41 is connected to the swing link 42, the swing link 42 is mounted to the bearing core 43, and the bearing core 43 is used for mounting the swash bearing 40*a* onto the mounting shaft 31. The bearing core 43 can rotate with the mounting shaft 31 or not rotate with the mounting shaft 31. In this manner, when the bearing core 43 rotates with the mounting shaft 31, the bearing core 43 drives the swing link 42 to reciprocate, and the swing link 42 drives the striking member 41 to reciprocate in the sleeve 51 to strike the impact block 44 so that the impact block 44 can output the impact force to the functional element 61. In this case, the functional element 61 is subjected to the impact of the impact block 44 while rotating, and the electric hammer 100 is in the hammer drill mode. When the bearing core 43 does not rotate with the mounting shaft 31, the striking member 41 cannot impact the impact block 44, and the impact block 44 does not output the impact force to the functional element 61. In this case, the functional element 61 only rotates, and the electric hammer 100** is in the drill mode.

When the clutch assembly 80 is in the first state, the clutch assembly 80 can drive the bearing core 43 to rotate with the mounting shaft 31 so that the striking member can reciprocate in the sleeve 51 to drive the impact block 44 to output the impact force to the functional element 61. In this case, the electric hammer 100 is in the hammer drill mode. When the clutch assembly 80 is in the second state, the clutch assembly 80 no longer drives the bearing core 43 to rotate with the mounting shaft 31, the mounting shaft 31 can rotate relative to the impact assembly 40, and the mounting shaft 31 drives the output assembly 50 to rotate so that the functional element 61 is driven to rotate. In this case, the functional element 61 only rotates, that is, the electric hammer 100 is in the drill mode.

In an example, the clutch assembly 80 includes an input portion 81 and an output portion 82. The input portion 81 rotates synchronously with the mounting shaft 31, and the output portion 82 rotates synchronously with the bearing core 43 of the swash bearing **40*a*. The output portion 82 can move relative to the input portion 81 so that the input portion 81 can mate with the output portion 82 and the input portion 81 can also get rid of mating with the output portion 82. When the clutch assembly 80 is in the first state, the output portion 82 moves relative to the input portion 81 to a position where the output portion 82 mates with the input portion 81. In this case, the clutch assembly 80 can drive the swash bearing 40*a* to impact the impact block 44. When the clutch assembly 80 is in the second state, the output portion 82 moves relative to the input portion 81 to a position where the output portion 82 gets rid of mating with the input portion 81. In this case, the clutch assembly 80 cannot drive the swash bearing 40*a*, and the swash bearing 40*a* cannot drive the impact block 44**.

As shown in FIGS. 2 to 6, the switching assembly 70 includes a switching element 71 including a forced end 711 and a drive end 712. The forced end 711 is in contact with the output assembly 50 and can be driven by the output assembly 50 to move along the first axis 102, and the drive end 712 is in contact with the clutch assembly 80 to drive the clutch assembly 80 to be switched between the first state and the second state. When the output assembly 50 moves relative to the housing 10 along the first axis 102, the output assembly 50 drives the forced end 711 to move and the forced end 711 drives the drive end 712 to move together, so as to drive the clutch assembly 80 to be switched from the second state to the first state. In an up and down direction, the switching element 71 is disposed on the lower side of the first axis 102. With this configuration, the whole machine of the electric hammer 100 can have a relatively reasonable dimension. The forced end 711 of the switching element 71 is directly connected to the output assembly 50, and the drive end 712 of the switching element 71 directly drives the clutch assembly 80. In this manner, in this example, the state of the clutch assembly 80 can be switched only through one switching element 71 disposed on the lower side of the first axis 102 of the sleeve 51, which is not only simple in structure but also fully utilizes the space on the lower side of the first axis 102. Thus, the whole machine has a compact structure and a more reasonable arrangement. In an example, in order that part of the impact assembly 40 is accommodated in the sleeve 51, the dimension of the sleeve 51 along the direction of the first axis 102 is relatively large, so the sleeve 51 needs to occupy a relatively large space in the direction of the first axis 102. The switching element 71 is disposed on the lower side of the first axis 102 so that the space on the lower side of the sleeve 51 can be fully utilized. With this configuration, the following case can be avoided: when the switching element 71 is disposed on the left or right side of the sleeve 51, the dimension of the whole formed by the sleeve 51 and the switching element 71 in a left and right direction is relatively large, and thus the housing 10 can be prevented from too large a dimension in the left and right direction. Thus, the electric hammer 100 can conveniently perform perforation against a left or right wall. In addition, with this configuration, the following case is also avoided: when the switching element 71 is disposed on the upper side of the first axis 102, the upper surface of the housing 10 is relatively far from the first axis. Thus, the electric hammer 100 conveniently performs perforation against an upper wall.

The switching element 71 is disposed on the lower side of the first axis, and when the output assembly 50 moves rearward along the first axis, the clutch assembly 80 can be switched to the first state through the forced end of the switching element 71 and the drive end of the switching element 71 so that the electric hammer is switched from the drill mode to the hammer drill mode. Thus, not only is the structure for mode switching of the electric hammer simplified, but also an axial dimension of the whole machine is reduced.

An orthographic projection of the switching element 71 on a plane perpendicular to the first axis 102 at least partially overlaps an orthographic projection of the first transmission portion 52 on the plane perpendicular to the first axis 102. That is to say, the orthographic projection of the first transmission portion 52 on the plane perpendicular to the first axis 102 has a highest point and a lowest point, and the orthographic projection of the switching element 71 on the plane is located between the highest point and the lowest point. As an example, the forced end 711 of the switching element 71 abuts against the first transmission portion 52, and the drive end 712 of the switching element 71 is connected to the clutch assembly 80. That is, when the sleeve 51 is forced to move along the first axis 102, the first transmission portion 52 moves with the sleeve 51 along the first axis 102 so that the forced end 711 abutting against the first transmission portion 52 is forced to slide along the first axis 102 and the drive end 712 drives the clutch assembly 80 to be switched to the first state. Thus, the electric hammer 100 is in the hammer drill mode. That is to say, the switching element 71 fully utilizes the space on the lower side of the sleeve 51 so that the structure and the position of the mounting shaft 31 or another part can be well planned, thereby causing the whole machine to have a more reasonable layout. In an example, the dimension of the switching element 71 in the up and down direction is smaller than the dimension of the first transmission portion 52 in the up and down direction, that is to say, the dimension of the switching element 71 in the up and down direction is smaller than a diameter of the first transmission portion 52, and the switching element 71 is disposed on the lower side of the sleeve 51. In an example, the switching element 71 is disposed between the first axis 102 and the second axis 103, and the first transmission portion 52 meshes with the mounting shaft 31 so that a position where the first transmission portion 52 meshes with the mounting shaft 31 has a certain height difference in the up and down direction. With the preceding configuration, the height difference can be fully utilized, that is to say, the switching element 71 fully utilizes the space on the lower side of the sleeve 51 and the upper side of the mounting shaft 31 so that mode switching can be implemented through the switching element 71 without the adjustment of a structural arrangement. The forced end 711 of the switching element 71 may abut against a drive portion formed on the sleeve 51. This configuration can also implement a switching function. Specific principles and functions are substantially the same as those in the case where the forced end 711 abuts against the first transmission portion 52. Therefore, the details are not repeated here.

The sleeve 51 is substantially symmetrical about a vertical plane P, where the vertical plane is a plane along the up and down direction, the first axis 102 is located in the plane P, and a portion of the switching element 71 between the first axis 102 and the second axis 103 is distributed on two sides of the plane P. In order that the switching function is implemented, the switching element 71 is made of some wear-resistant materials such as high-density steel so as to ensure the running of the machine. These materials are relatively heavy. With the preceding configuration, the weight of the switching element 71 can be distributed on the two sides of the plane P as much as possible so that the balance of the whole machine can be ensured.

Figure 5:
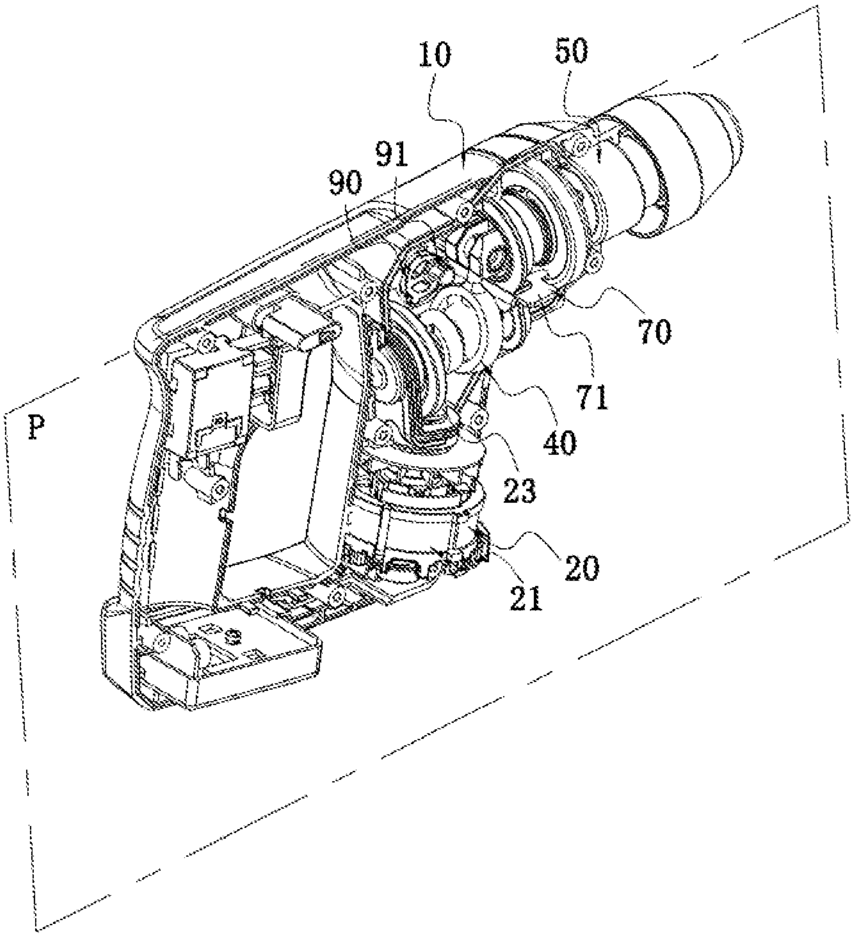
FIG. 5 is a perspective view of part of the structure of the electric hammer shown in FIG. 1 in a drill mode.

As shown in FIGS. 1 and 5, in order that the working mode of the electric hammer 100 is switched, the electric hammer 100 further includes a shift assembly 90 which is adjustable by the user. The shift assembly 90 includes a limiting portion 91 configured to prevent the sleeve 51 or the switching element 71 from moving rearward along the direction of the first axis 102. The user may adjust the shift assembly 90 to move the limiting portion 91 to a released position and a restrained position. When the shift assembly 90 is at the released position, the limiting portion 91 allows the sleeve 51 and the switching element 71 to move along the first axis 102, and when the shift assembly 90 is at the restrained position, the limiting portion 91 prevents the sleeve 51 and the switching element 71 from moving along the direction of the first axis 102. In an example, a stopper portion 714 configured to mate with the limiting portion 91 is fixedly connected to or integrally formed with the switching element 71. When the user adjusts the shift assembly 90 to move the limiting portion 91 to the restrained position, the limiting portion 91 abuts against the stopper portion 714, and the limiting portion 91 prevents the switching element 71 from moving along the direction parallel to the first axis 102. That is, in this case, the switching element 71 cannot drive the output portion 82 to be coupled to the input portion 81. Thus, the electric hammer 100 is in the drill mode. When the user adjusts the shift assembly 90 to move the limiting portion 91 to the released position, the limiting portion 91 is disengaged from the stopper portion 714, and the limiting portion 91 allows the sleeve 51 and the stopper portion to move along the direction of the first axis 102. In this case, the sleeve 51 moves rearward under the action of an external force, and the switching element 71 moves along the direction parallel to the first axis 102 when receiving a driving force from the sleeve 51 so that the switching element 71 can drive the output portion 82 to be coupled to the input portion 81. Thus, the electric hammer 100 enters the hammer drill mode.

In this example, the clutch assembly 80 is disposed on the rear side of the swash bearing 40*a* along the direction of the second axis 103. The input portion 81 of the clutch assembly 80 is fixedly connected to or integrally formed with the first transmission member 32, and the output portion 82 of the clutch assembly 80 is fixedly connected to or integrally formed with the bearing core 43. The input portion 81 is first meshing teeth formed on the first transmission member 32 and extending toward the bearing core 43, and the output portion 82 is second meshing teeth formed on the bearing core 43 of the swash bearing 40*a* and facing the first transmission member 32. When the input portion 81 and the output portion 82 mesh with each other, the clutch assembly 80 is in the first state. When the input portion 81 and the output portion 82 are disengaged from each other, the clutch assembly 80 is in the second state. The switching element 71 is in contact with the bearing core 43 of the swash bearing 40*a*. When the switching element 71 is subjected to the driving force of the sleeve 51, the switching element 71 drives the bearing core 43 to move along the direction of the second axis 103 toward the first transmission member 32. In this case, the output portion 82 on the bearing core 43 moves to a position where the output portion 82 meshes with the input portion 81 on the first transmission member 32 so that the clutch assembly 80 is switched to the first state. Thus, the electric hammer 100 enters the hammer drill mode. The clutch assembly 80 further includes a reset member 83 biased between the swash bearing 40*a* and the first transmission member 32. The reset member 83 is configured to bias an output portion so that the clutch assembly 80 has the tendency to be switched to the second state. In this manner, when the switching element 71 no long receives the driving force of the sleeve 51, the reset member 83 drives the swash bearing 40*a* to move along the second axis 103 to a state where the output portion 82 is disengaged from the input portion 81. At this time, the clutch assembly 80 is in the second state. Thus, the electric hammer 100 is in the drill mode.

In an example, an end face of the first transmission member 32 is recessed inward to form the input portion 81. The end face of the first transmission member 32 is recessed inward so that a slot is formed, and a wall of the slot protrudes toward the second axis 103 to form protruding teeth which constitute the input portion 81. In this manner, on the one hand, the dimension of the whole formed by the input portion 81 and the first transmission member 32 is reduced, which is conducive to reducing the dimension of the transmission assembly 30 along the direction of the second axis 103. On the other hand, when the output portion 82 meshes with the input portion, the output portion 82 is inserted into the slot so that a movement stroke of the output portion 82 can be increased. Thus, the reliability of the clutch assembly 80 is improved. In addition, a proper space is provided for placing the reset member 83 so that the dimension of the transmission assembly 30 along the direction of the second axis 103 can be further reduced, which is conducive to reducing the length of the electric hammer 100 in a front and rear direction. The output portion 82 extends rearward from an end face of the bearing core 43, the bearing core 43 extends rearward to form an annular portion, and an end face of the annular portion is provided with teeth to form the output portion 82. The reset member 83 is disposed between the output portion 82 and the input portion 81 and is specifically a spring at least partially disposed in the annular portion. With the preceding configuration, when the sleeve 51 is forced to move along the first axis 102, the first transmission portion 52 drives the switching element 71 to slide so that the drive end 712 of the switching element 71 drives the impact assembly 40 to move along the second axis 103. In this case, the impact assembly 40 is forced to compress the spring, the spring is deformed, and a coupling portion of the bearing core 43 meshes with the input portion 81 of the first transmission member 32 so that the clutch assembly 80 is switched to the first state. When the force applied to the sleeve 51 is cancelled, the spring drives, according to an elastic force thereof, the coupling portion of the bearing core 43 to be disengaged from the input portion 81. In this case, the impact assembly 40 rotates relative to the mounting shaft 31 so that the impact assembly 40 is switched to the second state. With the preceding configuration, the output portion 82 of the bearing core 43 extends into the first transmission member 32, that is to say, a position where the bearing core 43 is connected to the first transmission member 32 is on the inner side of the first transmission member 32. Thus, the space on the inner side of the first transmission member 32 is utilized so that the dimension of the whole machine in the left and right direction can be reduced in the case where a stable structure is ensured. In an example, the input portion 81 is configured to protrude outward from the first transmission member 32 and be in the shape of teeth, and the output portion 82 is configured to be recessed rearward and in the shape of teeth. With this configuration, the structural strength of the connection between the input portion 81 and the output portion 82 is enhanced and the running stability of the whole machine is ensured.

Figure 14:
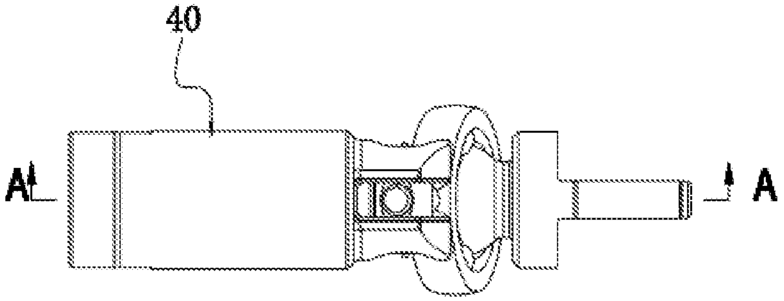
FIG. 14 is a top view of an impact assembly in the electric hammer shown in FIG. 1.
Figure 15:
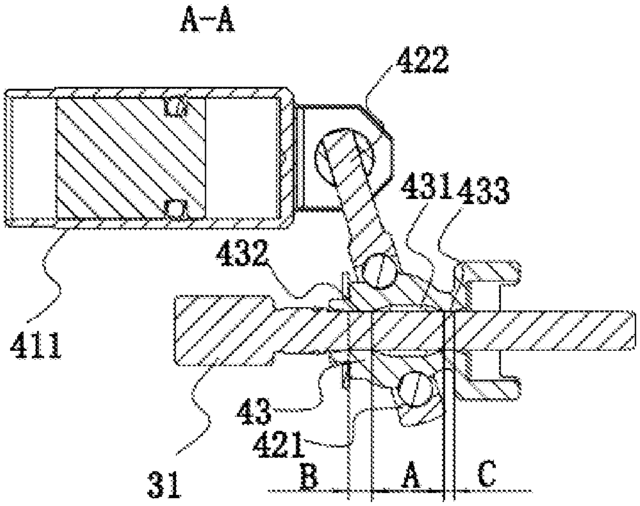
FIG. 15 is a sectional view of a swash bearing shown in FIG. 14 along an A-A direction.

As shown in FIGS. 14 and 15, the bearing core 43 is mounted on the mounting shaft 31, the bearing core 43 is movable along the second axis 103, and an accommodation cavity 431 configured to accommodate lubricant is disposed in the bearing core 43. The lubricant is provided in the accommodation cavity 431 so that the frictional force of the bearing core 43 rotating or sliding relative to the mounting shaft 31 can be reduced. Due to the relative rotation between the bearing core 43 and the mounting shaft 31, a gap exists between the mounting shaft 31 and the bearing core 43. When the electric hammer 100 stands still, the bearing core 43 has two contact surfaces with the mounting shaft 31 due to the influence of gravity, where the two contact surfaces are a first contact surface 432 and a second contact surface 433, and the accommodation cavity 431 is formed between the two contact surfaces. Along the direction of the second axis 103, the accommodation cavity 431 has a first length A, the first contact surface 432 has a second length B, and the second contact surface 433 has a third length C, where the first length A is greater than a sum of the second length B and the third length C. With the preceding configuration, the accommodation cavity 431 has a relatively large space so that more lubricant can be accommodated in the accommodation cavity 431, which reduces the frictional force, prevents impact when the electric hammer 100 is in the drill mode, avoids damage to the machine, and can also prolong the life of the impact assembly 40. The first length A is greater than or equal to 8 mm and less than or equal to 20 mm, the second length B is greater than or equal to 0.5 mm and less than or equal to 4 mm, and the third length C is greater than or equal to 0.5 mm and less than or equal to 4 mm. The preceding ranges can not only ensure that the accommodation cavity 431 has a sufficient accommodation space but also avoid the case where the bearing core 43 is too long in a length direction to increase the dimension of the whole machine.

The swing link 42 includes a ring 421 sleeved on the bearing core 43 and a connecting rod 422 integrally formed with the ring 421. The swash bearing 40*a* further includes a movable sleeve 411 mounted to an end of the connecting rod 422, where the striking member is disposed in the movable sleeve 411, and the movable sleeve 411 can drive the striking member to strike the impact block 44. The connecting rod 422 extends along the direction of a first straight line 104, and the movable sleeve 411 and the ring 421 are disposed at two ends of the connecting rod 422. When the bearing core 43 moves, the swing link 42 is movable to a first extreme position and a second extreme position, and the connecting rod 422 is movable to the first extreme position and the second extreme position. When the swing link 42 is at the first extreme position, the connecting rod 422 is inclined forward to a first extreme angle. That is to say, when the connecting rod 422 is at the first extreme angle, the movable sleeve 411 moves forward by a longest distance it can move. In this case, the first straight line 104 is parallel to the electric motor axis 101, where a distance between the first straight line 104 and the electric motor axis 101 is greater than or equal to 0 mm and less than or equal to 20 mm. The first straight line 104 may not be parallel to the electric motor axis 101, but this configuration causes the movable sleeve 411 to move forward, increasing the dimension of the sleeve 51 in the front and rear direction and the dimension of the whole machine. Alternatively, the first straight line 104 is not parallel to the electric motor axis 101, which causes the position of the bearing core 43 to be further rearward than the position of the bearing core 43 in the case where the first straight line 104 is parallel to the electric motor axis 101. Thus, the dimension of the mounting shaft 31 in the front and rear direction needs to be increased, and the dimension of the whole machine in the length direction needs to be increased. That is to say, the first straight line 104 is parallel to or coincides with the electric motor axis 101 and the gap between the first straight line 104 and the electric motor axis 101 is set to be in the preceding range so that the dimension of the whole machine in the front and rear direction can be in a relatively reasonable range. In an example, the distance between the first straight line 104 and the electric motor axis 101 is greater than or equal to 10 mm and less than or equal to 20 mm. With the preceding configuration, a better effect is achieved. Alternatively, in another example, when the swing link is at the first extreme position, the connecting rod is at the first extreme angle, the first straight line intersects with the electric motor axis to form an included angle greater than or equal to 0 degrees and less than or equal to 5 degrees, and an intersection of the first straight line and the electric motor axis is on the electric motor. Thus, similarly, the dimension of the whole formed by the swash bearing 40*a* and the movable sleeve 411 along the direction of the first axis 102 can also be reduced as much as possible. When the swing link 42 is at the second extreme position, the connecting rod 422 is inclined rearward to a second extreme angle, that is to say, when the connecting rod 422 is at the second extreme angle, the movable sleeve 411 moves rearward by a longest distance it can move. In this case, the first straight line 104 intersects with the first axis 102.

In this example, the ratio of the weight of the impact assembly 40 to output power of the electric motor 21 is greater than or equal to 0.09 g/W and less than or equal to 0.16 g/W. In some other examples, the ratio of the weight of the impact assembly 40 to the output power of the electric motor 21 is greater than or equal to 0.06 g/W and less than or equal to 0.12 g/W. The weight of the impact assembly 40 is reduced, and the electric motor 21 can output sufficiently high output power so that performance can be ensured and the weight of the whole machine can be reduced.

Figure 11:
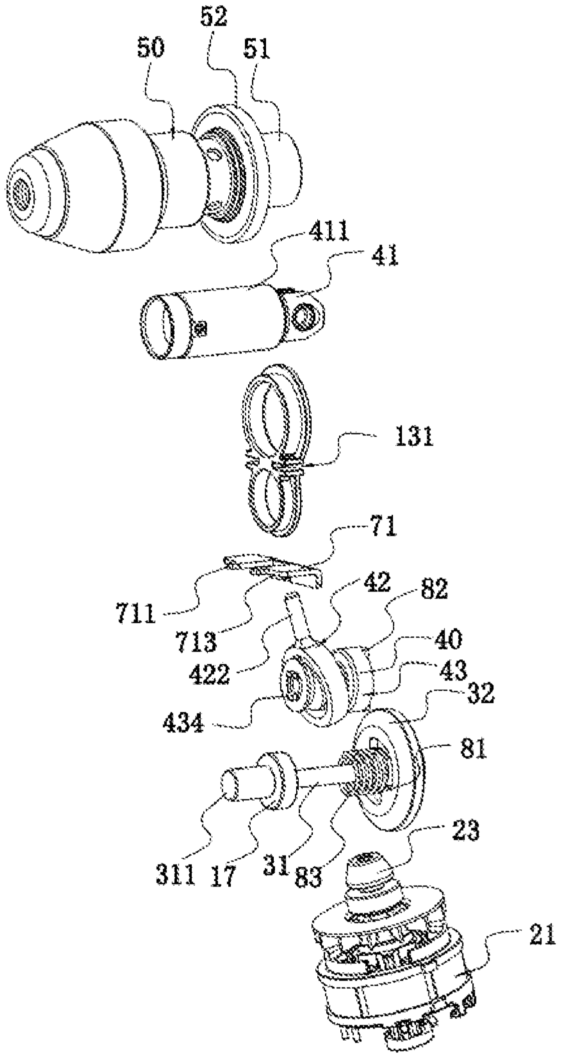
FIG. 11 is an exploded view of part of the structure of the electric hammer shown in FIG. 1.
Figure 12:
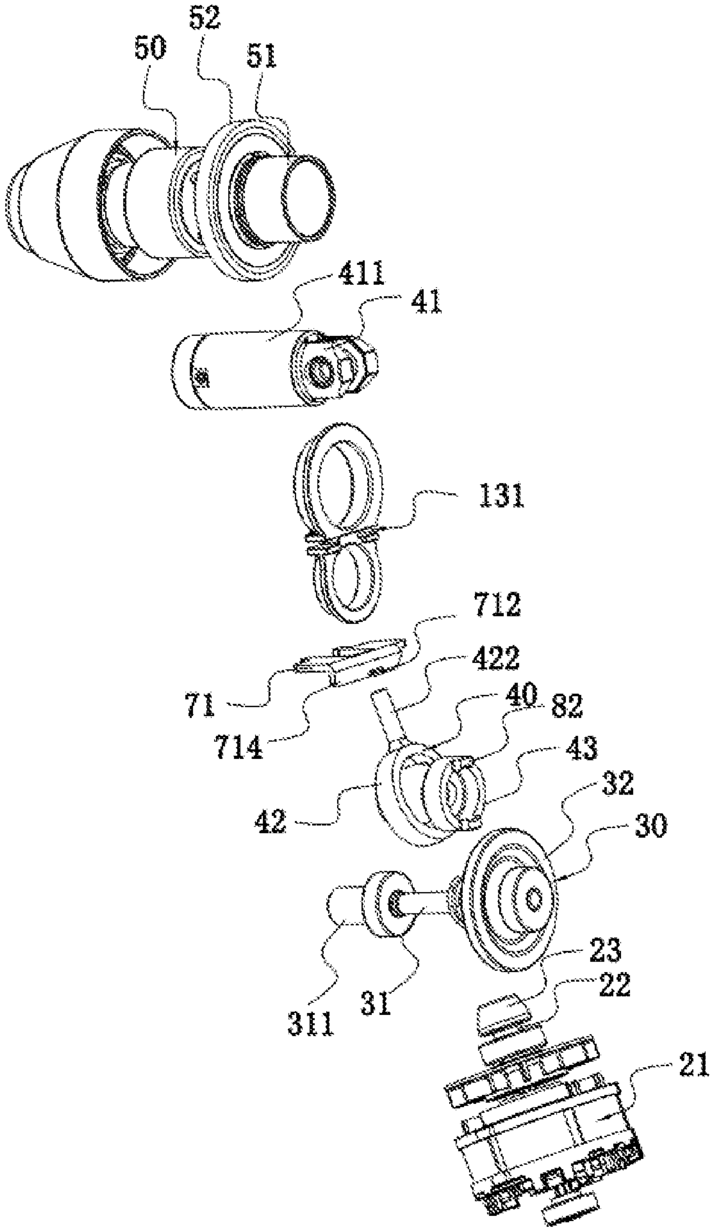
FIG. 12 is an exploded view of the part of the structure of the electric hammer shown in FIG. 11 from another angle of view.

As shown in FIGS. 2, 11, and 12, the electric hammer 100 further includes a support bracket 13 configured to support the mounting shaft 31. The support bracket 13 is fixedly connected to or integrally formed with the housing 10. The support bracket 13 divides the housing 10 into a first space 15 and a second space 16, and the bearing core 43 is located in the second space 16, that is, the first space 15 is located on the front side of the second space 16 in the front and rear direction. The support bracket 13 is sleeved on the sleeve 51 and configured to position the sleeve 51. The mounting shaft 31 passes through the support bracket 13 so that a constant spacing between the sleeve 51 and the mounting shaft 31 is ensured. The sleeve 51 and the mounting shaft 31 are rotatable relative to the support bracket 13. In the up and down direction, the mounting shaft 31 is disposed below the sleeve 51. In the front and rear direction, the support bracket 13 is disposed on the front side of the clutch assembly 80.

Figure 3:
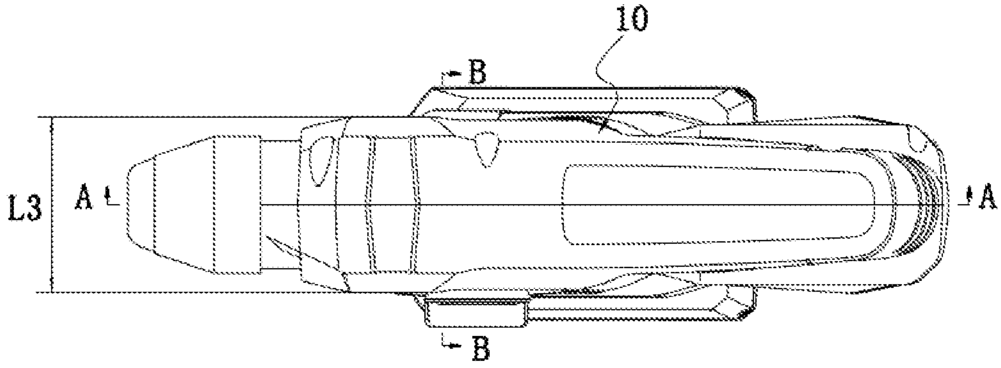
FIG. 3 is a top view of the whole machine of the electric hammer shown in FIG. 1.
Figure 4:
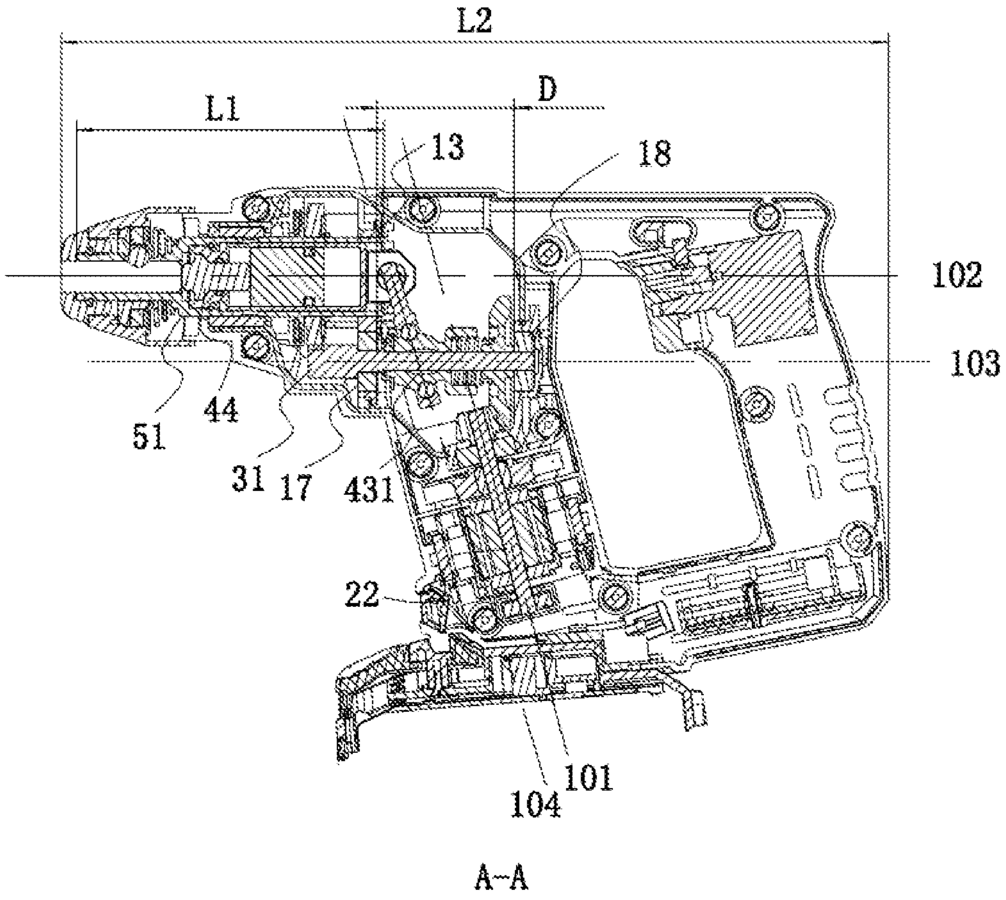
FIG. 4 is a sectional view of the electric hammer shown in FIG. 3 along an A-A direction.

As shown in FIGS. 2 to 4, the electric hammer 100 further includes a positioning assembly configured to position the mounting shaft 31, where the positioning assembly includes a first bearing 17 and a second bearing 18 which are disposed on two sides of the clutch assembly 80 separately. The first bearing 17 is mounted to the mounting shaft 31, disposed on the front side of the clutch assembly 80, and disposed in the support bracket 13. A mounting hole used for mounting the first bearing 17 is formed on the support bracket 13. The second bearing 18 is mounted to the mounting shaft 31, disposed on the rear side of the clutch assembly 80, and disposed in the housing 10. In this example, a product of a distance between the first bearing 17 and the second bearing 18 and the weight of the main body 100*a* is greater than or equal to 27 mm·kg and less than or equal to 58 mm·kg. In an example, the product of the distance between the first bearing 17 and the second bearing 18 and the weight of the main body 100*a* is greater than or equal to 40 mm·kg and less than or equal to 58 mm·kg. With the configuration of the structures and positions of the clutch assembly 80, the switching assembly 70, and the impact assembly 40, the distance between the first bearing 17 and the second bearing 18 is reduced, thereby reducing the dimension of the transmission assembly 30 along the direction of the second axis 103. Thus, the dimension of the main body 100*a* along the front and rear direction is reduced, which is conducive to the miniaturization of the electric hammer 100. Moreover, with the configuration of the structures and positions of the clutch assembly 80, the switching assembly 70, and the impact assembly 40, the weight of the main body 100*a* is greatly reduced so that a small and light electric hammer 100 is obtained. In an example, the output power of the electric motor 21 is greater than or equal to 360

W and less than or equal to 440 W so that it can also be ensured that the electric hammer 100 has relatively high power on the premise that the electric hammer 100 is small and light.

In the front and rear direction, the second transmission portion is disposed on the front side of the first bearing, and the first transmission portion is disposed on the front side of the first bearing. With this configuration, the structures and positions of the clutch assembly 80, the switching assembly 70, and the impact assembly 40 can be reasonably arranged.

In this example, the distance D between the first bearing 17 and the second bearing 18 along the direction of the second axis 103 is greater than or equal to 30 mm and less than or equal to 50 mm. In some other examples, the distance D between the first bearing 17 and the second bearing 18 along the direction of the second axis 103 is greater than or equal to 40 mm and less than or equal to 46 mm. With this configuration, the distance between the first bearing 17 and the second bearing 18 is set to be in a proper range, that is, a sufficient space for disposing the impact assembly 40, the switching assembly 70, and the clutch assembly 80 can exist between the first bearing 17 and the second bearing 18. In addition, the case can also be avoided where the whole machine is too long due to too large a spacing between the first bearing 17 and the second bearing 18.

In an example, the ratio of the weight of the main body 100*a* to the output power of the electric motor 21 is greater than or equal to 2.2 g/W and less than or equal to 4.5 g/W. In some other examples, the ratio of the weight of the main body 100*a* to the output power of the electric motor 21 is greater than or equal to 3 g/W and less than or equal to 4 g/W. Thus, in the case where the maximum output power of the electric motor 21 meets a working requirement, the weight of the main body 100*a* is greatly reduced, which further facilitates the operation of the user.

As shown in FIGS. 11 and 12, at least one guide slot 131 for guiding the movement of the switching element 71 is formed on the support bracket 13. The switching element 71 partially passes through the guide slot 131 and can reciprocate along the guide slot 131. When the output assembly 50 moves along the first axis 102, the forced end 711 can transmit the driving force from the output assembly 50, and the driving force is transmitted to the clutch assembly 80 through the drive end 712, thereby switching the clutch assembly 80 to the first state. The support bracket 13 may be formed with two guide slots 131 disposed on the two sides of the plane P separately. Two protrusions 713 which are spaced and configured to correspond to the guide slots 131 are formed on the switching element 71, and a respective forced end 711 is formed on each protrusion 713. In an example, the switching element 71 is forced to be slidable along the guide slots 131, that is to say, the switching element 71 can apply the driving force to the clutch assembly 80 during the movement, thereby switching the electric hammer 100 from the drill mode to the hammer drill mode. The guide slots 131 are disposed on an outer edge of the support bracket 13 so that the machining of parts is facilitated and the machining process of the parts is simplified. The guide slot 131 is parallel to the first axis 102 so that the switching element 71 has a smallest length along the direction of the first axis 102 in the case where it is ensured that function conversion can be implemented. A slide manner may not be adopted for the switching element 71. For example, a spring or the like may be adopted for the switching element 71, and the clutch assembly 80 is driven through the properties of the spring.

At least one air vent which can penetrate through the first space 15 and the second space 16 is formed on the support bracket 13. In the present application, the guide slot may be used as the air vent. That is to say, in this example, the guide slot 131 can be used for not only guiding the movement of the switching element 71 but also exhausting and sucking air. Thus, it can be ensured that the machine runs normally.

Figure 13:
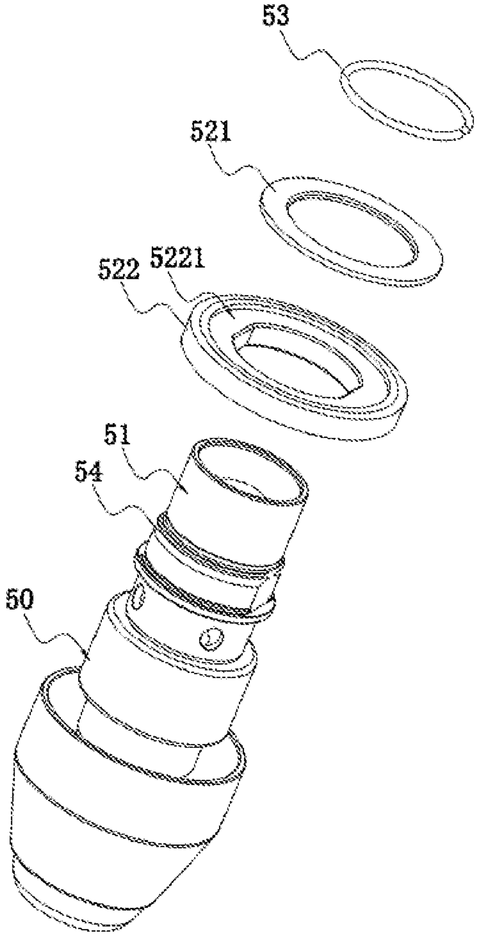
FIG. 13 is an exploded view of part of the structure of the electric hammer shown in FIG. 1.

As shown in FIGS. 4 and 13, the first transmission portion 52 is fixedly connected to the sleeve 51, and the forced end 711 of the switching element 71 abuts against the first transmission portion 52. A positioning member 53 is fixedly connected to the sleeve 51 and configured to restrain the first transmission portion 52 from moving rearward on the sleeve 51. A positioning groove 54 is formed on the sleeve 51 and used for mounting the positioning member 53, where the positioning groove 54 is radially recessed inward along the periphery of the sleeve 51 so that the positioning member 53 is mounted and fixed. The first transmission portion 52 includes an intermediate member 521 and a rotating member 522, where the intermediate member 521 is configured to be in contact with the switching element 71, and the rotating member 522 is configured to be in contact with the second transmission portion to receive the power outputted from the transmission assembly 30. An accommodation space 5221 is formed on the rotating member 522. The rotating member 522 is recessed inward to form the accommodation space 5221, and the intermediate member 521 is at least partially accommodated in the accommodation space 5221. In this example, the switching element 71 abuts against the intermediate member 521, the positioning member 53 is a circlip, the intermediate member 521 is specifically a gasket, and the rotating member 522 is a gear. During the running, the circlip runs relative to the gear. Thus, the gear is abraded, and the life of the gear is affected. In addition, if the switching element 71 abuts against the gear, the switching element 71 abrades the gear, and the life of the gear is affected. However, the gasket is disposed on a rear end face of the gear so that the direct abrasion of the gear by the switching element 71 can be avoided, thereby prolonging the life of the gear. The gasket may be directly mounted to a rear end portion of the gear, increasing the dimension of the gear and the gasket on the axis and increasing the dimension of the sleeve 51 on the axis. However, according to the preceding description, the accommodation space 5221 is disposed in the gear, which can avoid an increase of the dimension of the whole formed by the gear and the gasket in the direction of the first axis 102. Moreover, the weight of the gear can be reduced due to the existence of the accommodation space 5221, thereby reducing the weight of the whole machine.

The accommodation space 5221 is specifically disposed on the rear end face of the gear. The rear end face of the gear is recessed forward so as to form the accommodation space 5221, and a diameter of the accommodation space 5221 is smaller than a root diameter of the gear. Thus, in the case where it is ensured that the accommodation space 5221 has a sufficient space for accommodating the gasket, an effective face width of the gear is not affected, ensuring the stability of the connection between the gear and the mounting shaft 31.

In this example, the sleeve 51 has a length L1 along the direction of the first axis 102, the main body 100*a* has a length L2 along the first axis 102, and the housing 10 has a length L3 in the direction perpendicular to the first axis 102, where the ratio of the length L2 to the length L1 is greater than or equal to 2.5 and less than or equal to 4, and the length L3 is greater than or equal to 55 mm and less than 70 mm.

In some other examples, the ratio of the length L2 to the length L1 is greater than or equal to 3 and less than or equal to 4. In this manner, with the configuration of the positions and structures of the clutch assembly 80, the impact assembly 40, and the output assembly 50 in the main body 100*a*, the width of the main body 100*a* and the length of the main body 100*a* are reduced, and the sleeve 51 has a sufficient space where the striking member can reciprocate, thereby ensuring the running stability of the whole machine. With this configuration, the impact assembly 40 can have a sufficient movement stroke, and the length of the sleeve 51 in the direction of the first axis 102 can be in a reasonable range. Thus, the whole machine has a compact structure, and the case is avoided where the whole machine is too long along the direction of the first axis 102, which facilitates the operation of the user. In this example, the length L1 is greater than or equal to 80 mm and less than or equal to 101 mm. It is to be noted that the length L3 refers to the width of the housing 10 with which the sleeve 51 is wrapped.

Figure 7:
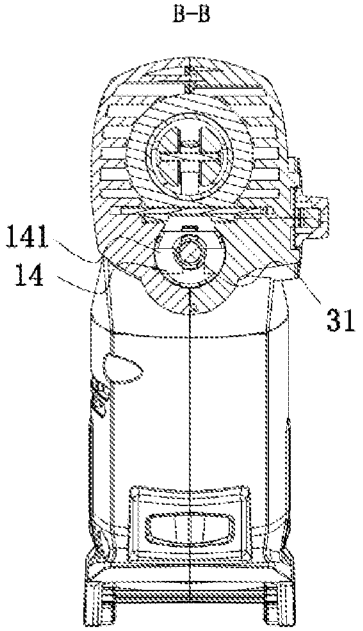
FIG. 7 is a sectional view of the electric hammer shown in FIG. 3 along a B-B direction.
Figure 8:
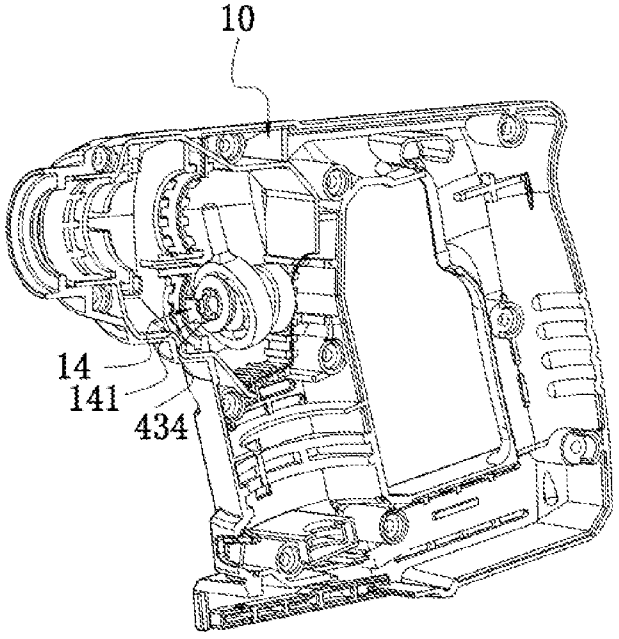
FIG. 8 is a schematic view of part of the structure of the electric hammer shown in FIG. 1.
Figure 9:
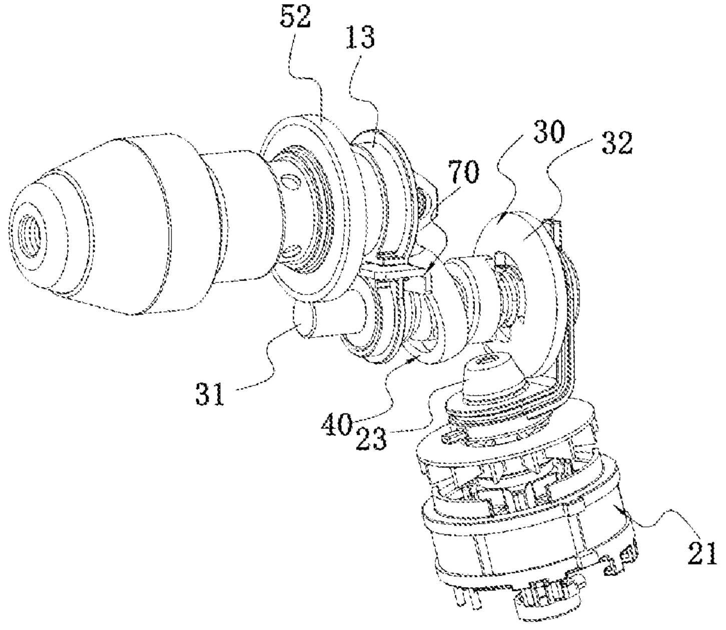
FIG. 9 is a schematic view of part of the structure of the electric hammer shown in FIG. 1.
Figure 10:
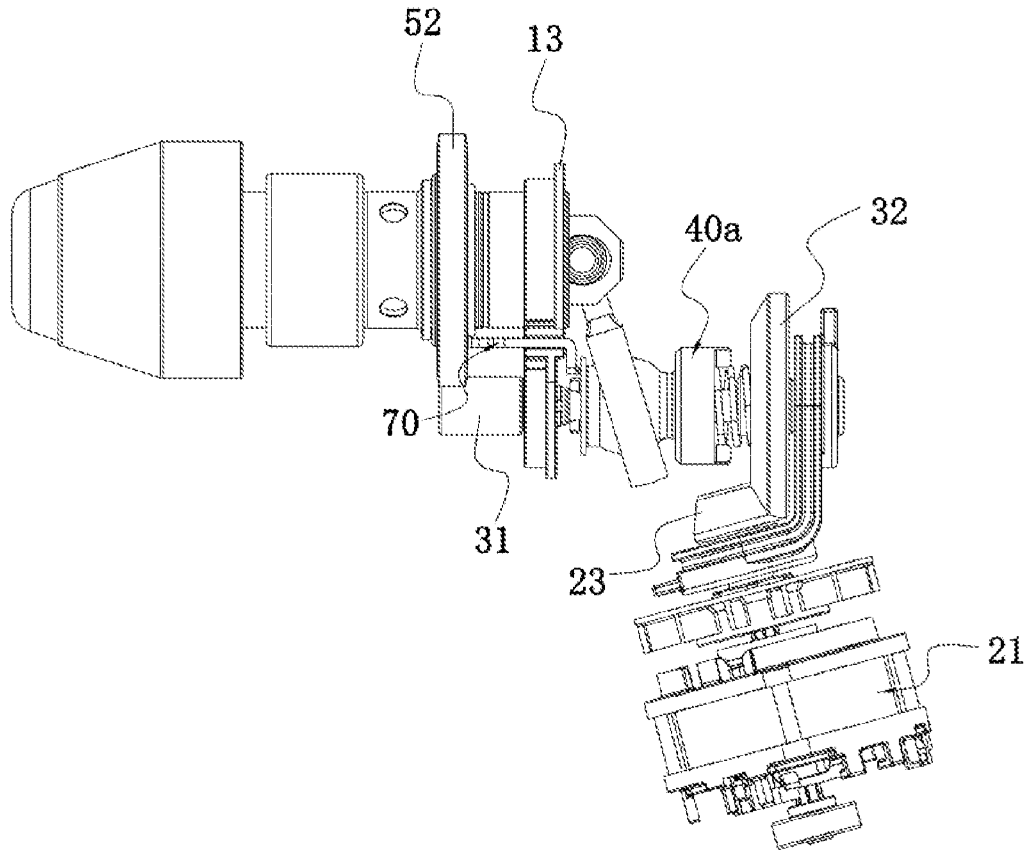
FIG. 10 is a plan view of part of the structure of the electric hammer shown in FIG. 1.

As shown in FIGS. 7 and 8, the electric hammer 100 further includes a locking assembly, where the locking assembly is used for locking the impact assembly 40 and includes a locking element 14. When the clutch assembly 80 is in the first state, the locking element 14 releases the movement of the impact assembly 40. When the clutch assembly 80 is in the second state, the locking element 14 prevents the movement of the impact assembly 40. During the slide of the swash bearing 40*a* on the mounting shaft 31, the swash bearing 40*a* has a first position (as shown in FIG. 6) and a second position (as shown in FIG. 2). When the swash bearing 40*a* is at the first position, the bearing core 43 rotates synchronously with the mounting shaft 31, that is, the electric hammer 100 is in the hammer drill mode. When the swash bearing 40*a* is at the second position, the bearing core 43 can rotate relative to the mounting shaft 31, that is, the electric hammer 100 is in the drill mode. To prolong the life of the impact assembly 40 and facilitate the slide of the swash bearing 40*a* on the mounting shaft 31, the lubricant is often added in the bearing core 43. However, this configuration causes the frictional force between the mounting shaft 31 and the bearing core 43 due to the existence of the lubricant. That is to say, when the electric hammer 100 is in the drill mode, due to the existence of the lubricant, the rotating mounting shaft 31 drives the swash bearing 40*a* to move. Thus, in the case where the electric hammer 100 is in the drill mode, the striking member reciprocates in the sleeve 51 to strike the impact block 44, and the impact block 44 outputs the impact force to the functional element, which easily damages a machined workpiece and affects working progress. The locking element 14 configured to prevent the impact assembly 40 from striking the impact block 44 is disposed so that the preceding case can be avoided, thereby ensuring the running progress of the machine and improving user experience. In addition, a failure rate of the machine is also reduced.

When the swash bearing 40*a* is at the first position, the locking element 14 is separated from the bearing core 43, and the bearing core 43 can rotate synchronously with the mounting shaft 31. When the swash bearing 40*a* is at the second position, the locking element 14 meshes with the bearing core 43, that is, the mounting shaft 31 can rotate relative to the bearing core 43. In this example, the locking element 14 is fixedly connected to or integrally formed with the housing 10 and includes a locking portion 141, and an engagement portion 434 mating with the locking portion 141 is disposed on the bearing core 43. In an example, the bearing core 43 protrudes forward and forms the engagement portion 434 so as to mate with the locking portion 141. The bearing core 43 may be recessed inward to form the engagement portion 434. Driven by no external force, the reset member 83 drives the bearing core 43 to be disengaged from the first transmission member 32, and the bearing core 43 moves along the second axis 103 to a position where the engagement portion 434 mates with the locking portion 141. In an example, the engagement portion 434 is disposed on the front side of the bearing core 43, and the locking portion 141 is disposed at any position in a circumferential direction of the engagement portion 434. The locking portion 141 may be a pin, a shift fork, or the like fixedly connected to the housing 10. In this example, the locking portion 141 is formed by a rib extending from the housing 10, and the locking portion 141 is made of a wear-resistant material. Other examples may be provided as long as the locking portion 141 allows the rotation of the bearing core 43 with the mounting shaft 31 when the swash bearing 40*a* is at the first position and restrains the rotation of the bearing core 43 when the swash bearing 40*a* is at the second position.

FIGS. 16 to 23 show the schematic views of the internal structure of an electric hammer in a second example. In this example, an electric motor, an output assembly, a support bracket, a functional accessory, and the like are substantially the same as those in the first example except that a switching assembly, a transmission assembly, and a locking assembly have different specific structures. That is to say, the parts described in the first example and compatible with this example are each applicable to this example, and only the differences between this example and the first example are described below.

Figure 16:
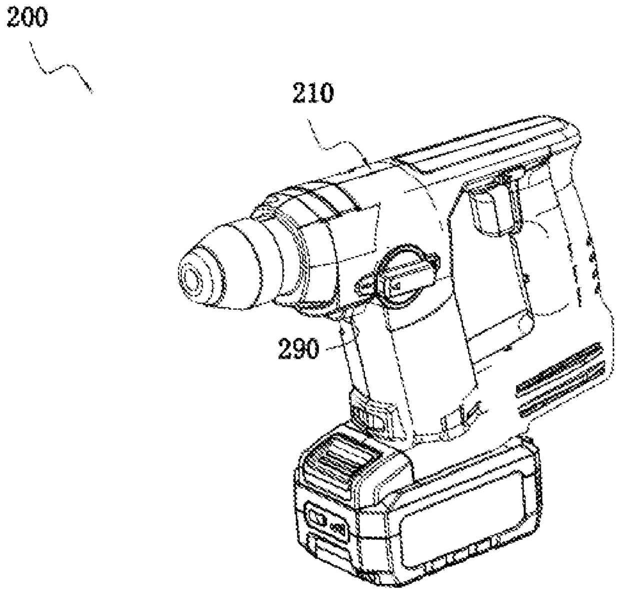
FIG. 16 is a perspective view of an electric hammer in a second example of the present application.
Figure 17:
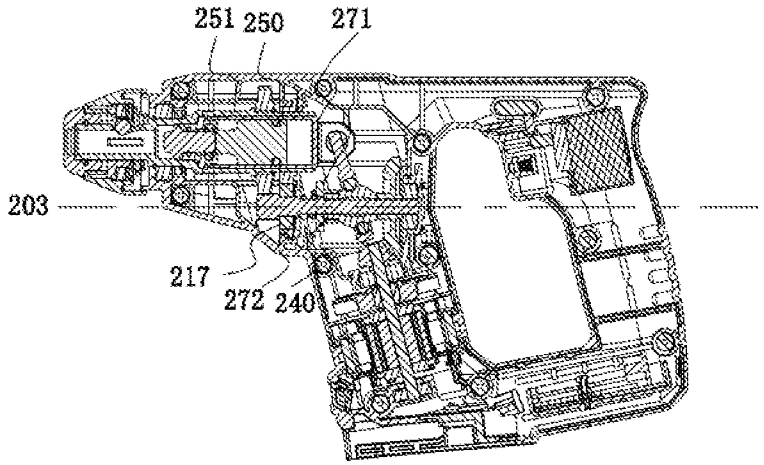
FIG. 17 is a sectional view of the electric hammer shown in FIG. 16 along the direction of a second axis.
Figure 18:
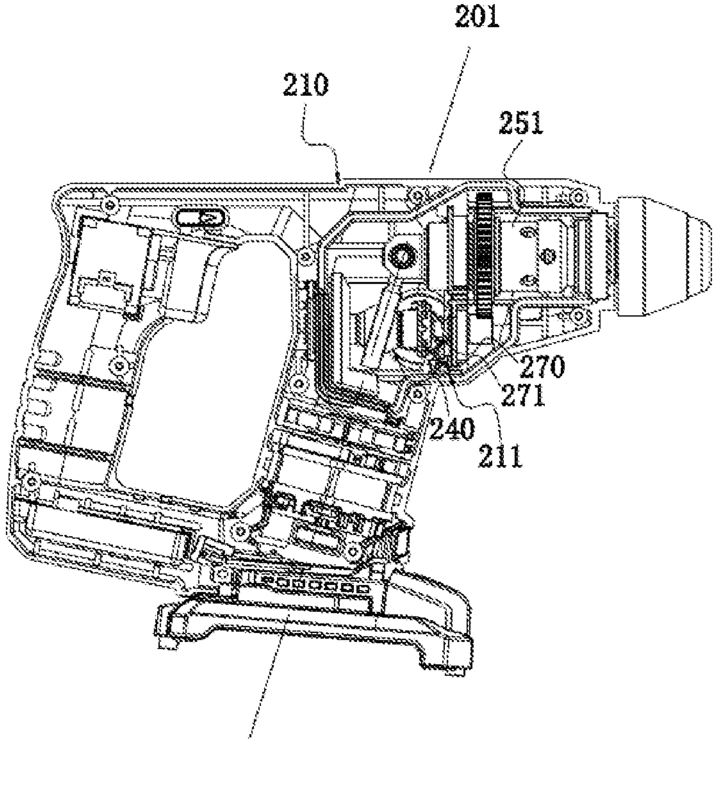
FIG. 18 is a schematic view of part of the structure of the electric hammer shown in FIG. 16 in a hammer drill mode.
Figure 19:
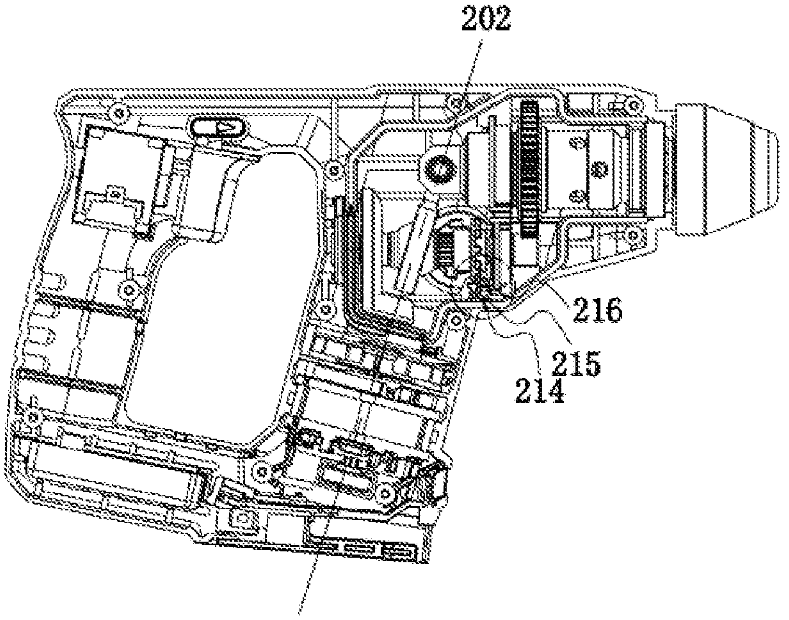
FIG. 19 is a schematic view of part of the structure of the electric hammer shown in FIG. 16 in a drill mode.

As shown in FIGS. 16 to 18, an electric hammer 200 includes a clutch assembly 270 for switching the electric hammer 200 between a drill mode and a hammer drill mode. An impact assembly includes a swash bearing 240. The swash bearing 240 includes a first running state (as shown in FIG. 18) and a second running state (as shown in FIG. 19). When the swash bearing 240 is in the first running state, a bearing core 241 of the swash bearing 240 rotates with a mounting shaft 231. In this case, the electric hammer 200 is in the hammer drill mode. When the swash bearing 240 is in the second running state, the bearing core 241 of the swash bearing 240 rotates relative to the mounting shaft 231. In this case, the electric hammer 200 is in the drill mode.

The clutch assembly 270 includes a clutch member 271 and an elastic member 272, where the elastic member 272 can apply an elastic force to the clutch member 271 for the clutch member 271 to approach the swash bearing 240 so that the swash bearing 240 enters the first running state, that is, the electric hammer 200 enters the hammer drill mode. When the clutch member 271 is driven to overcome the elastic force and move away from the swash bearing 240, the swash bearing 240 enters the second running state, that is, the electric hammer 200 enters the drill mode. That is to say, function and mode switching can be implemented only through the clutch member 271 and the elastic member 272 so that parts are greatly saved, which can not only reduce the volume and dimension of the whole machine but also simplify a structure and facilitate machining. Further, with the preceding configuration, the weight of the whole machine can also be reduced, which facilitates the operation of the machine by a user.

Figure 21:
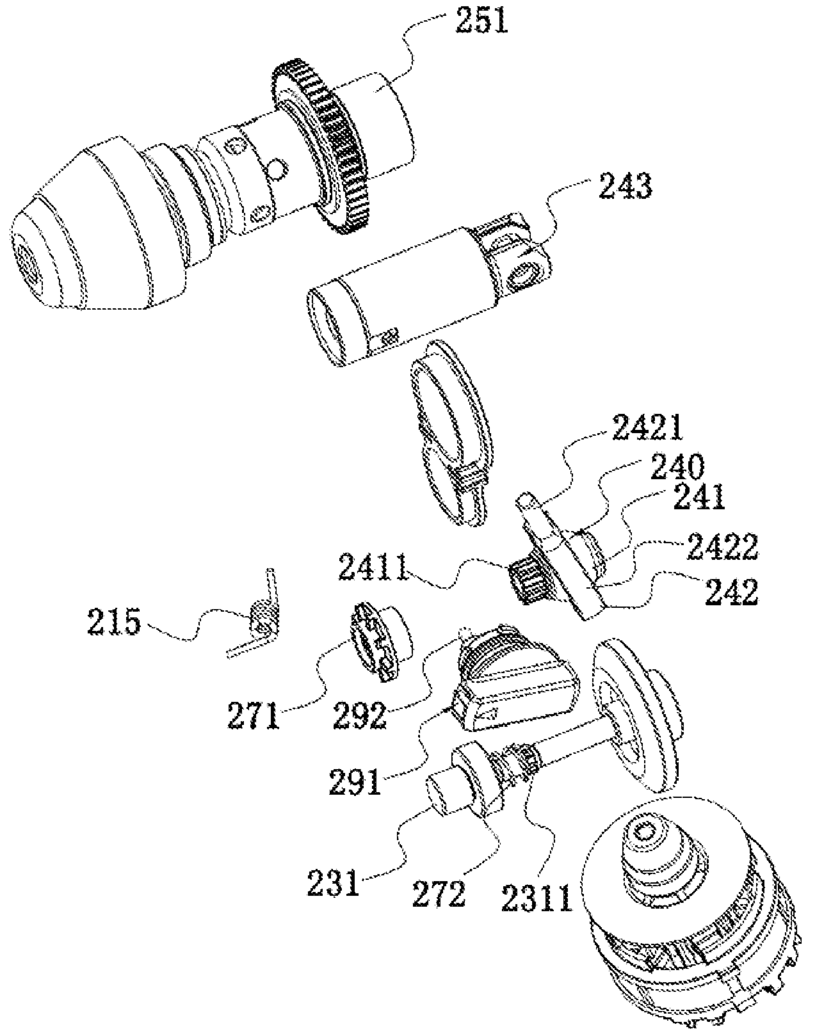
FIG. 21 is an exploded view of part of the structure of the electric hammer shown in FIG. 16.
Figure 22:
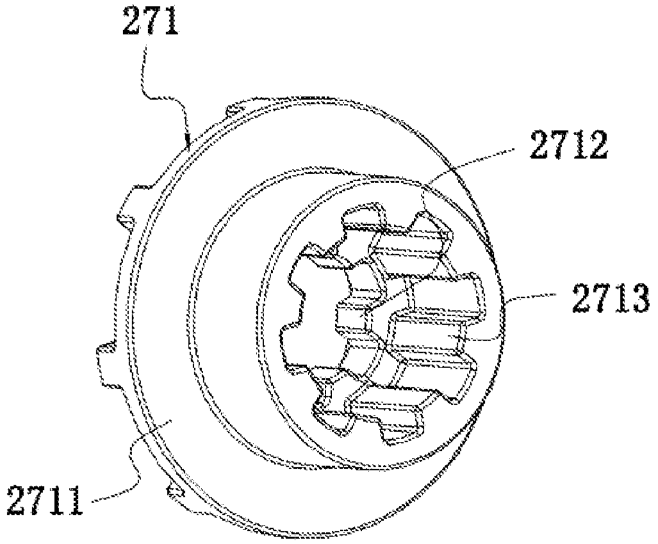
FIG. 22 is a perspective view of a switching element in the electric hammer shown in FIG. 21.
Figure 23:
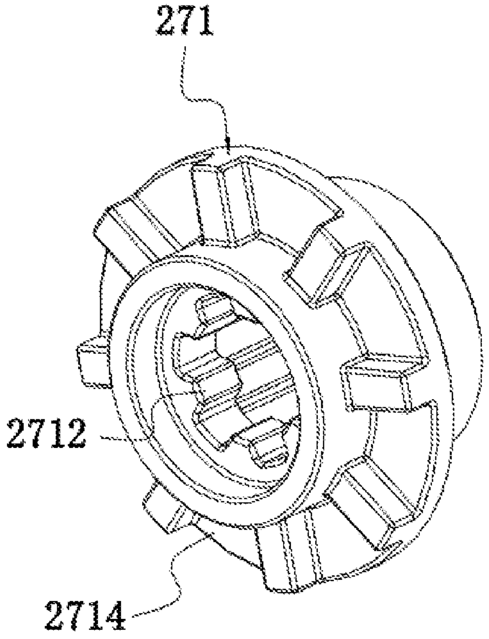
FIG. 23 is a perspective view of a switching element shown in FIG. 21 from another angle of view.

As shown in FIGS. 16, 21, and 23, the electric hammer 200 further includes a shift assembly 290, where the shift assembly 290 includes a shift member 291 configured to drive the clutch member 271, and the shift member 291 is operated by the user. The user switches the electric hammer 200 between the drill mode and the hammer drill mode by driving the shift member 291.

Figure 20:
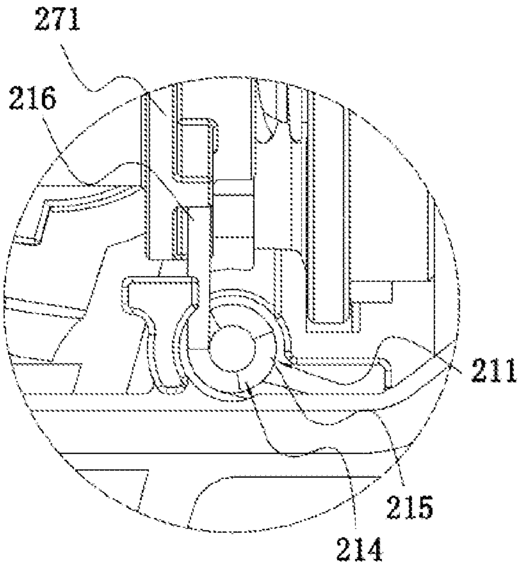
FIG. 20 is a partial enlarged view of the structure shown in FIG. 19.

In an example, the clutch member 271 rotates synchronously with the bearing core 241 of the swash bearing 240. A meshing portion 2712 is formed on the clutch member 271, and a connecting portion 2311 configured to mate with the meshing portion 2712 on the clutch member 271 is formed on the mounting shaft 231. When the connecting portion 2311 mates with the meshing portion 2712, the clutch member 271 is in a first switching state (as shown in FIG. 18) in which the bearing core 241 of the swash bearing 240 can rotate with the mounting shaft 231. In this case, the impact assembly can output an impact force, and the electric hammer 200 is in the hammer drill mode. When the connecting portion 2311 is disengaged from the meshing portion 2712, the clutch member 271 is in a second switching state (as shown in FIGS. 19 and 20) in which the power transmission between the mounting shaft 231 and the bearing core 241 is disabled. In this case, the impact assembly cannot output the impact force, and the electric hammer 200 is in the drill mode.

In an example, the clutch member 271 is sleeved on the mounting shaft 231, and the clutch member 271 is slidable on the mounting shaft 231 along the direction of a second axis 203. The clutch member 271 is rotatable relative to the mounting shaft 231. The meshing portion 2712 is formed on an inner wall of the clutch member 271 and is specifically first meshing teeth formed on the inner wall of the clutch member 271. The connecting portion 2311 is first driving teeth fixedly connected to or integrally formed with the mounting shaft 231. When the clutch member 271 approaches the swash bearing 240, the meshing portion 2712 of the clutch member 271 moves to a state in which the meshing portion 2712 meshes with the connecting portion 2311 on the mounting shaft 231. When the clutch member 271 moves away from the swash bearing 240, the meshing portion 2712 of the clutch member 271 moves to a state in which the meshing portion 2712 is disengaged from the connecting portion 2311.

When operated by the user, the shift member 291 can drive the clutch member 271 to move along the second axis 203 so that the swash bearing 240 is switched between the first running state and the second running state. The shift member 291 includes a drive portion 292. The drive portion 292 can apply a driving force to the clutch member 271 so that the clutch member 271 moves away from the swash bearing 240, thereby causing the swash bearing 240 to enter the second running state. In an example, a forced portion 2711 mating with the drive portion 292 is disposed on the clutch member 271. When the shift member 291 is operated by the user, the drive portion 292 drives the forced portion 2711 to move forward so that the meshing portion 2712 on the clutch member 271 is separated from the connecting portion 2311 on the mounting shaft 231, thereby enabling the mounting shaft 231 to move relative to the bearing core 241. A mating portion 2713 is formed on the clutch member 271, an extension portion 2411 configured to mate with the mating portion 2713 on the clutch member 271 is formed on the bearing core 241, and the clutch member 271 rotates synchronously with the bearing core 241 of the swash bearing 240. The mating portion 2713 is disposed at a rear end of the meshing portion 2712 and is specifically second meshing teeth formed on the inner wall of the clutch member 271. The extension portion 2411 is second driving teeth fixedly connected to or integrally formed with the bearing core 241. During the slide of the clutch member 271, the second meshing teeth and the second driving teeth always keep meshing with each other.

The elastic member 272 is sleeved on the mounting shaft 231, at least partially disposed in the clutch member 271, and disposed on the front side of the clutch member 271 along the direction of the second axis. In this example, a front end of the elastic member 272 is connected to a first bearing 217 on the mounting shaft 231, and a rear end of the elastic member 272 is connected to the meshing portion 2712 on the clutch member 271.

As shown in FIGS. 19 to 23, the electric hammer 200 further includes a locking assembly 214 configured to lock the swash bearing 240. That is, when the electric hammer 200 is in the drill mode, the locking assembly 214 prevents the bearing core 241 of the swash bearing 240 from rotating. When the electric hammer 200 is in the hammer drill mode, the locking assembly 214 allows the bearing core 241 of the swash bearing 240 to rotate.

In this example, the locking assembly 214 includes a locking element 215, where a locking portion 216 which can be deformed is connected to the locking element 215, and an engagement portion 2714 mating with the locking portion 216 and configured to prevent the clutch member 271 from rotating is connected to the clutch member 271. An accommodation portion 211 is formed on a housing 210, and the locking element 215 is at least partially disposed in the accommodation portion 211. The locking element 215 is made of a flexible member such as a spring pin or an elastic column. In this example, the locking element 215 is a torsion spring mounted in the accommodation portion 211. An end portion of the torsion spring extends upward and can mate with the clutch member 271. The engagement portion 2714 is stopper teeth formed by protruding forward on the clutch member 271. When the electric hammer 200 is in the drill mode, the torsion spring is engaged with the stopper teeth of the clutch member 271, that is, the clutch member 271 cannot rotate so that the bearing core 241 cannot move. When the electric hammer 200 is in the hammer drill mode, the torsion spring is not in contact with the stopper teeth, that is, the bearing core 241 can rotate with the clutch member 271. Deformation refers to that when the stopper teeth are engaged with the locking portion 216, the stopper teeth press down the locking portion 216, that is, the stopper teeth apply a contact force to the locking portion 216, and the locking portion 216 receives the contact force and is deformed. Thus, damage to parts is avoided, and the locking portion 216 produces a force for preventing the stopper teeth from being disengaged from the locking portion 216 and rotating, thereby ensuring structural stability.

The main body referred to herein refers to a bare machine without the functional accessory, the energy source, and an auxiliary handle.

What is claimed is:

1. An electric hammer, comprising:
- a main body;
- a housing as a sub-assembly of the main body;
- an electric motor at least partially disposed in the housing;
- an output assembly comprising a sleeve rotatable about a first axis;
- an impact assembly comprising a swash bearing and an impact block capable of being driven by the swash bearing to reciprocate in the sleeve, wherein the impact block is capable of outputting an impact force forward when moving in the sleeve; and
- a mounting shaft for mounting the swash bearing, wherein the mounting shaft is capable of being driven by the electric motor to rotate about a second axis;

wherein the electric hammer has a drill mode and a hammer drill mode, when the electric hammer is in the drill mode, the sleeve rotates, and, when the electric hammer is in the hammer drill mode, the sleeve rotates and the impact block reciprocates in the sleeve;

wherein the electric hammer further comprises a clutch assembly having a first state in which the swash bearing is capable of being driven to move with the mounting shaft and a second state in which the mounting shaft is allowed to rotate relative to the swash bearing, wherein the sleeve has a length L1 along a direction of the first axis, wherein the main body has a length L2 along the direction of the first axis, wherein the housing has a length L3 in a direction perpendicular to the first axis, and wherein a ratio of the length L2 to the length L1 is greater than or equal to 2.5 and less than or equal to 4, and the length L3 is greater than or equal to 55 mm and less than 70 mm.

2. The electric hammer according to claim 1, wherein the sleeve is substantially symmetrical about a vertical plane.

3. The electric hammer according to claim 1, further comprising a first transmission member configured to receive power outputted from the electric motor to drive the mounting shaft to rotate;

wherein the clutch assembly comprises:

an input portion rotating synchronously with the first transmission member or the mounting shaft; and an output portion for mating with the input portion to drive the swash bearing to move;

wherein the swash bearing is slidable on the mounting shaft along the second axis, the output portion is slidable with the swash bearing along the second axis, and the swash bearing and is capable of driving a whole formed by the swash bearing and the output portion to slide along the second axis.

4. The electric hammer according to claim 3, wherein the swash bearing comprises a bearing core mounted to the mounting shaft and the bearing core extends toward the first transmission member to form the output portion.

5. The electric hammer according to claim 1, wherein the output assembly further comprises:

a first transmission portion fixedly connected to the sleeve; and a second transmission portion rotating synchronously with the mounting shaft and driving the first transmission portion to rotate.

6. The electric hammer according to claim 1, further comprising a support bracket fixedly connected to or integrally formed with the housing, wherein the support bracket is configured to support the mounting shaft.

7. The electric hammer according to claim 1, wherein the output assembly further comprises:

a first transmission portion fixedly connected to the sleeve; and a second transmission portion rotating synchronously with the mounting shaft and driving the first transmission portion to rotate;

wherein an orthographic projection of the first transmission portion on a plane perpendicular to the first axis has a highest point and a lowest point.

8. The electric hammer according to claim 1, further comprising:

a transmission assembly comprising a first transmission member capable of being driven by the electric motor to rotate about the second axis, wherein the first transmission member is fixedly connected to the mounting shaft;

wherein the swash bearing comprises a bearing core mounted on the mounting shaft, wherein when the electric hammer is in the hammer drill mode, the sleeve rotates and the bearing core rotates synchronously with the mounting shaft;

the swash bearing is slidable on the mounting shaft along the second axis to a first position and a second position, wherein when the swash bearing is at the first position, the bearing core rotates synchronously with the mounting shaft, and when the swash bearing is at the second position, the mounting shaft is rotatable relative to the bearing core; and the electric hammer further comprises a locking element, wherein when the swash bearing is at the second position, the locking element is configured to restrain the bearing core from rotating, and when the swash bearing is at the first position, the locking element allows the bearing core to rotate.

9. The electric hammer according to claim 8, wherein the bearing core is connected to an engagement portion which mates with the locking element.

10. The electric hammer according to claim 9, wherein the transmission assembly comprises an input portion configured to output power to the swash bearing, and the bearing core is connected to an output portion which mates with the input portion when the swash bearing is at the first position.

11. The electric hammer according to claim 10, wherein the output portion and the engagement portion are disposed at two ends of the bearing core separately.

12. The electric hammer according to claim 1, further comprising:

a transmission assembly comprising a first transmission member capable of being driven by the electric motor to rotate about the second axis, wherein the first transmission member is fixedly connected to the mounting shaft;

wherein the swash bearing comprises a bearing core mounted on the mounting shaft, wherein when the electric hammer is in the hammer drill mode, the sleeve rotates and the bearing core rotates synchronously with the mounting shaft;

wherein the swash bearing is slidable on the mounting shaft along the second axis to a first position and a second position;

wherein, when the swash bearing is at the first position, the bearing core rotates synchronously with the mounting shaft, and, when the swash bearing is at the second position, the mounting shaft is rotatable relative to the bearing core; and wherein the electric hammer further comprises a locking element, wherein when the swash bearing is at the first position, the locking element is separated from the bearing core to allow the bearing core to rotate, and when the swash bearing is at the second position, the locking element meshes with the bearing core to restrain the bearing core from rotating.

13. The electric hammer according to claim 1, wherein the output assembly further comprises a first transmission portion mating with the mounting shaft and configured to transmit power of the electric motor to the sleeve, the first transmission portion comprises a rotating member fixedly connected to the sleeve and an intermediate member mating with the rotating member, and an accommodation space configured to accommodate the intermediate member is formed on the rotating member.

14. The electric hammer according to claim 13, wherein a diameter of the accommodation space is smaller than a root diameter of the rotating member.

15. The electric hammer according to claim 1, wherein a transmission assembly further comprises an input portion configured to output power to the swash bearing, and the swash bearing is connected to an output portion which mates with the input portion;

wherein, when the electric hammer is in the drill mode, the output portion is separated from the input portion and, when the electric hammer is in the hammer drill mode, the output portion is coupled to the input portion.

16. The electric hammer according to claim 1, wherein a length of the sleeve along a direction of the first axis is less than or equal to 101 mm.

17. An electric hammer, comprising:

a main body;

a housing as a sub-assembly of the main body;

an electric motor at least partially disposed in the housing;

an output assembly comprising a sleeve rotatable about a first axis;

an impact assembly comprising a swash bearing and an impact block capable of being driven by the swash bearing to reciprocate in the sleeve, wherein the impact block is capable of outputting an impact force forward when moving in the sleeve; and a mounting shaft for mounting the swash bearing, wherein the mounting shaft is capable of being driven by the electric motor to rotate about a second axis;

wherein the electric hammer has a drill mode and a hammer drill mode, when the electric hammer is in the drill mode, the sleeve rotates, and, when the electric hammer is in the hammer drill mode, the sleeve rotates and the impact block reciprocates in the sleeve;

wherein the electric hammer further comprises a clutch assembly having a first state in which the swash bearing is capable of being driven to move with the mounting shaft and a second state in which the mounting shaft is allowed to rotate relative to the swash bearing, and a switching assembly configured to switch the clutch assembly between the first state and the second state and comprising a switching element, wherein the switching element comprises a forced end and a drive end, the output assembly moving along the first axis drives the forced end to move, and the drive end is configured to drive the clutch assembly to be switched to the first state, wherein the switching element is disposed on a lower side of the first axis wherein the sleeve has a length L1 along a direction of the first axis, wherein the main body has a length L2 along the direction of the first axis, wherein the housing has a length L3 in a direction perpendicular to the first axis, and wherein a ratio of the length L2 to the length L1 is greater than or equal to 2.5 and less than or equal to 4, and the length L3 is greater than or equal to 55 mm and less than 70 mm.

* * * * *